US010067559B2

(12) United States Patent
Wheeler et al.

(10) Patent No.: US 10,067,559 B2
(45) Date of Patent: Sep. 4, 2018

(54) GRAPHICAL INTERFACE HAVING ADJUSTABLE BORDERS

(71) Applicant: Google LLC, Mountain View, CA (US)

(72) Inventors: Aaron Wheeler, San Francisco, CA (US); Liang-Yu (Tom) Chi, San Francisco, CA (US); Sebastian Thrun, Los Altos Hills, CA (US); Hayes Solos Raffle, Palo Alto, CA (US); Nirmal Patel, Mountain View, CA (US)

(73) Assignee: Google LLC, Mountain View, CA (US)

( * ) Notice: Subject to any disclaimer, the term of this patent is extended or adjusted under 35 U.S.C. 154(b) by 908 days.

(21) Appl. No.: 14/288,033

(22) Filed: May 27, 2014

(65) Prior Publication Data

US 2014/0258902 A1 Sep. 11, 2014

Related U.S. Application Data

(63) Continuation of application No. 13/307,168, filed on Nov. 30, 2011, now abandoned.

(51) Int. Cl.
*G06F 3/048* (2013.01)
*G06F 3/01* (2006.01)
*G02B 27/01* (2006.01)
*G06F 3/0481* (2013.01)

(52) U.S. Cl.
CPC ........... *G06F 3/012* (2013.01); *G02B 27/017* (2013.01); *G06F 3/013* (2013.01); *G06F 3/0481* (2013.01)

(58) Field of Classification Search
CPC ......... G06F 3/012; G06F 3/013; G06F 3/0481
See application file for complete search history.

(56) References Cited

U.S. PATENT DOCUMENTS

| 5,742,263 | A  |   | 4/1998 | Wang et al. |
| 5,812,142 | A  | * | 9/1998 | Small ............... G06F 3/0485 345/676 |
| 6,396,497 | B1 |   | 5/2002 | Reichlen |
| 6,445,364 | B2 | * | 9/2002 | Zwern ............... G09B 21/008 345/156 |

(Continued)

FOREIGN PATENT DOCUMENTS

| EP | 2211224 | 7/2010 |
| JP | 8111878 | 4/1996 |

(Continued)

*Primary Examiner* — Anil N Kumar
(74) *Attorney, Agent, or Firm* — McDonnell Boehnen Hulbert & Berghoff LLP; Michael D. Clifford

(57) ABSTRACT

Methods and systems involving navigation of a graphical interface are disclosed herein. An example system may be configured to: (a) cause a head-mounted display (HMD) to provide a graphical interface, the graphical interface comprising (i) a view port having a view-port orientation and (ii) at least one navigable area having at least one border, the at least one border having a first border orientation; (b) receive input data that indicates movement of the view port towards the at least one border; (c) determine that the view-port orientation is within a predetermined threshold distance from the first border orientation; and (d) based on at least the determination that the view-port orientation is within a predetermined threshold distance from the first border orientation, adjust the first border orientation from the first border orientation to a second border orientation.

20 Claims, 17 Drawing Sheets

(56) References Cited

U.S. PATENT DOCUMENTS

| | | | |
|---|---|---|---|
| 6,868,360 | B1 | 3/2005 | Olstad et al. |
| 7,056,119 | B2 | 6/2006 | Olstad et al. |
| RE42,336 | E | 5/2011 | Fatch et al. |
| 2009/0231687 | A1 | 9/2009 | Yamamoto |
| 2010/0299630 | A1* | 11/2010 | McCutchen .............. H04N 7/18 715/803 |

FOREIGN PATENT DOCUMENTS

| | | |
|---|---|---|
| KR | 20030024021 | 3/2003 |
| KR | 100751290 | 8/2007 |

* cited by examiner

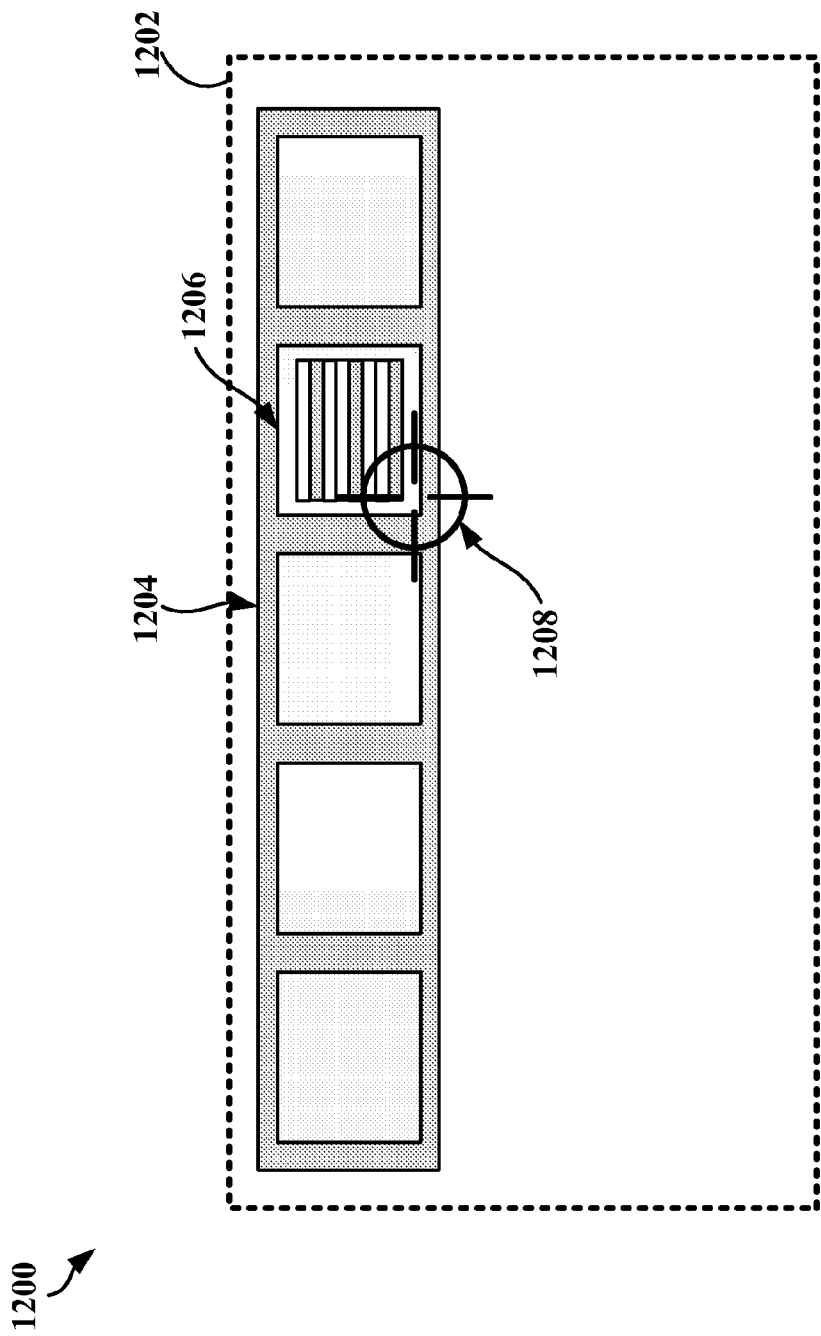

GRAPHICAL INTERFACE HAVING ADJUSTABLE BORDERS

CROSS-REFERENCE TO RELATED APPLICATION

This application is a continuation of U.S. patent application Ser. No. 13/307,168, field Nov. 30, 2011, the contents of which are hereby incorporated by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless other types of Internet-capable devices are increasingly prevalent in numerous aspects of modern life. Over time, the manner in which these devices provide information to users is becoming more intelligent, more efficient, more intuitive, and/or less obtrusive.

Additionally, a trend toward miniaturization of computing hardware, peripherals, as well as sensors, detectors, and image and audio processors, among other technologies, has helped open up a field sometimes referred to as "wearable computing." In particular, in the area of visual processing and production, it has become possible to implement wearable displays that place a very small image display element close enough to a wearer's (or user's) eye(s) such that the displayed image fills, or nearly fills, the wearer's field of view, and appears as a normal sized image, such as might be displayed on a traditional image display device. Such technology may be referred to as a "near-eye display."

Near-eye displays are fundamental components of wearable computers with displays, also sometimes called "head-mounted displays" (HMDs). Emerging and anticipated uses of near-eye displays may advantageously provide seamless use of a wearable computer. However, several challenges may arise as a result of the limited dimensions of a near-eye display, especially when viewing, searching, and/or browsing a graphical interface that is not entirely viewable within the display at one time. Such limited dimensions of the near-eye display may make some uses of the wearable computer potentially burdensome. Therefore, an improvement is desired.

SUMMARY

The systems and methods described herein may help provide for more convenient, efficient, and/or intuitive interactions with a graphical interface that is not entirely viewable within a display at one time. In one example embodiment, a system is provided. The system may include: (1) at least one processor; (2) a non-transitory computer readable medium; and (3) program instructions stored on the non-transitory computer readable medium and executable by the at least one processor to: (a) cause a head-mounted display (HMD) to provide a graphical interface, the graphical interface comprising (i) a view port having a view-port orientation and (ii) at least one navigable area having at least one border, the at least one border having a first border orientation; (b) receive input data that indicates movement of the view port towards the at least one border; (c) determine that the view-port orientation is within a predetermined threshold distance from the first border orientation; and (d) based on at least the determination that the view-port orientation is within a predetermined threshold distance from the first border orientation, adjust the first border orientation from the first border orientation to a second border orientation.

An example embodiment may involve a wearable computing system, such as an HMD, that continuously collects information about the user's body-movements (e.g., via sensors such as accelerometers, gyroscopes, and other input devices), and responsively provides a view port that displays a portion of a navigable area of a graphical interface. Such an embodiment may include an HMD with rich sensors to closely track the body-movements of the user. For example, an embodiment may include the entirety of the computing system within the HMD itself and/or may be networked with other computer systems for tracking such body-movements. Other examples and variations, some of which are discussed herein, are possible as well.

In a further aspect, a non-transitory computer-readable medium is provided. The non-transitory computer-readable medium may include instructions including: (1) instructions for causing a head-mounted display (HMD) to provide a graphical interface, the graphical interface comprising (i) a view port having a view-port orientation and (ii) at least one navigable area having at least one border, the at least one border having a first border orientation; (2) instructions for receiving input data that indicates movement of the view port towards the at least one border; (3) instructions for determining that the view-port orientation is within a predetermined threshold distance from the first border orientation; and (4) instructions for, based on at least the determination that the view-port orientation is within a predetermined threshold distance from the first border orientation, adjusting the first border orientation from the first border orientation to a second border orientation.

In yet a further aspect, a computer-implemented method is provided. The method may involve: (1) causing a head-mounted display (HMD) to provide a graphical interface, the graphical interface comprising (i) a view port having a view-port orientation and (ii) at least one navigable area having at least one border, the at least one border having a first border orientation; (2) receiving input data that indicates movement of the view port towards the at least one border; (3) determining that the view-port orientation is within a predetermined threshold distance from the first border orientation; and (4) based on at least the determination that the view-port orientation is within a predetermined threshold distance from the first border orientation, adjusting the first border orientation from the first border orientation to a second border orientation.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 12B shows aspects of an example user-interface after receiving movement data corresponding to an upward movement.

DETAILED DESCRIPTION

Figure 1A:
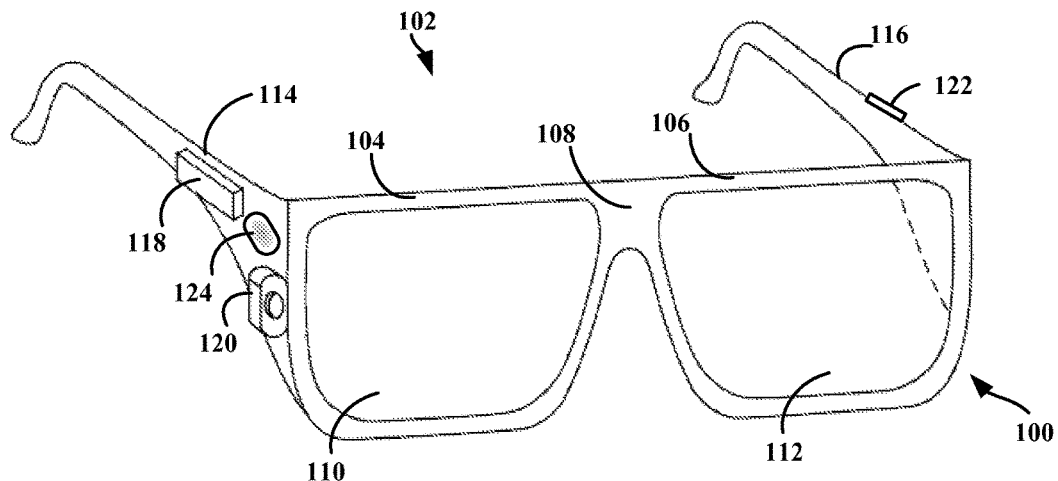
FIG. 1A shows an example system for receiving, transmitting, and displaying data.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. OVERVIEW

An example embodiment involves a wearable computer that may be configured to receive input data from head- and/or eye-movements of a user and responsively control the position (orientation) of a view port within a navigable area of a graphical interface. The view port, navigable area, and/or graphical interface may be displayed on a graphical display (e.g., a head-mounted display (HMD)). The view port may be configured to display only a portion of the navigable area and to hover or pan within the navigable area in response to certain gestures (e.g., movement of the head and/or eyes.) In such a case, an example view port may provide a wearer of an HMD with the sensation of looking through a window (i.e., the view port) into a portion of the navigable area of the graphical interface.

The navigable area may have one or more borders that define, or otherwise impact, how a user interacts with the graphical interface via the view port. For instance, consider an HMD that is worn by a user, and is thus rotatable in real space in 360 degrees (e.g., by the user turning his/her head and/or body). While the HMD is rotatable in real space throughout 360 degrees, it may be the case that, in a given implementation, a navigable area of a graphical interface implemented by the HMD is only 180 degrees. Such an implementation may be logical given a situation where a user that is stationary and able to (relatively comfortably) move his/her head 90 degrees to the left and 90 degrees to the right. In other words, the user may pan the view port throughout the entirety of the 180 degree navigable area simply be moving his/her head left and right.

However, consider the case where the user either (i) rotates his/her head greater than 90 degrees to the left or right or (ii) rotates his/her body while at the same time rotating his/her head at least 90 degrees to the left or right. In such a case, the view port may extend beyond the 180 degree navigable area of the 360 degree graphical interface. If the 180 degree navigable area is configured to contain content of interest (and the other 180 degrees of the graphical interface does not, for example, contain any content of interest) it may be undesirable for the view port to move outside of the 180 degree navigable area.

Such a situation may arise, for example, when the view port is near the left border of the navigable area and then the user of the HMD turns a corner to the left. In this instance, the user may naturally turn his/her body and/or head further to the left, perhaps inadvertently (and undesirably) causing the view port to move outside of the navigable area.

According to the disclosure herein, however, the navigable area may be configured to have borders that, when approached or contacted by the view port, cause the navigable area to reposition within the graphical interface based on the position and/or movement of the view port. In this way, the graphical interface may be configured such that the view port will not undesirably move beyond the navigable area. In other words, in the context of the example of the user turning the corner, the navigable area may be caused to "turn the corner" with the user (and the view port).

It should be understood that the above example is an example embodiment, is provided for illustrative purposes, and is just one of many possible applications of an example embodiment.

2. EXAMPLE WEARABLE COMPUTING DEVICE

FIG. 1A illustrates an example system 100 for receiving, transmitting, and displaying data. The system 100 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected by wires or wirelessly connected to the head-mounted device 102). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 11.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
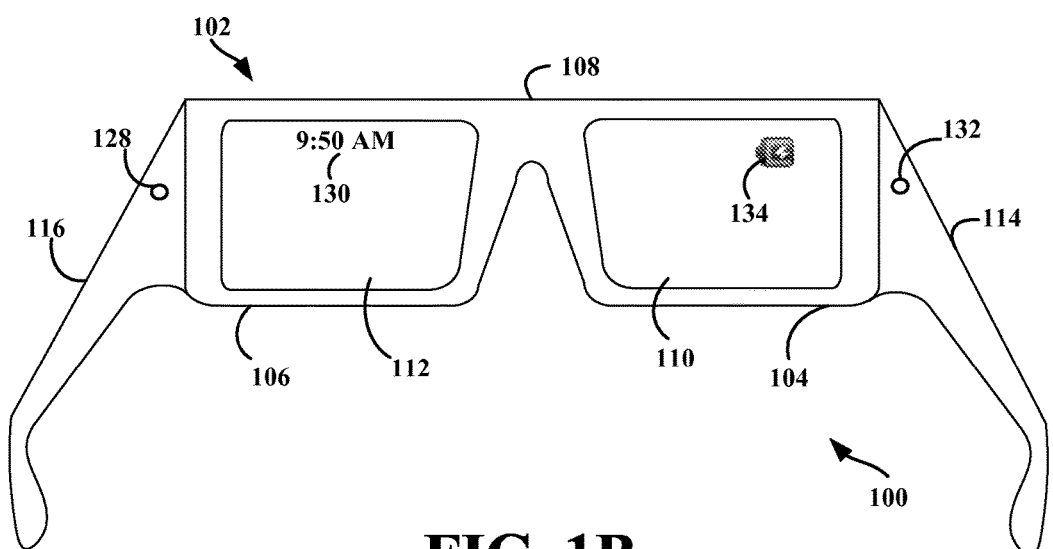
FIG. 1B shows an alternate view of the system illustrated in FIG. 1A.

FIG. 1B illustrates an alternate view of the system 100 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

Figure 2A:
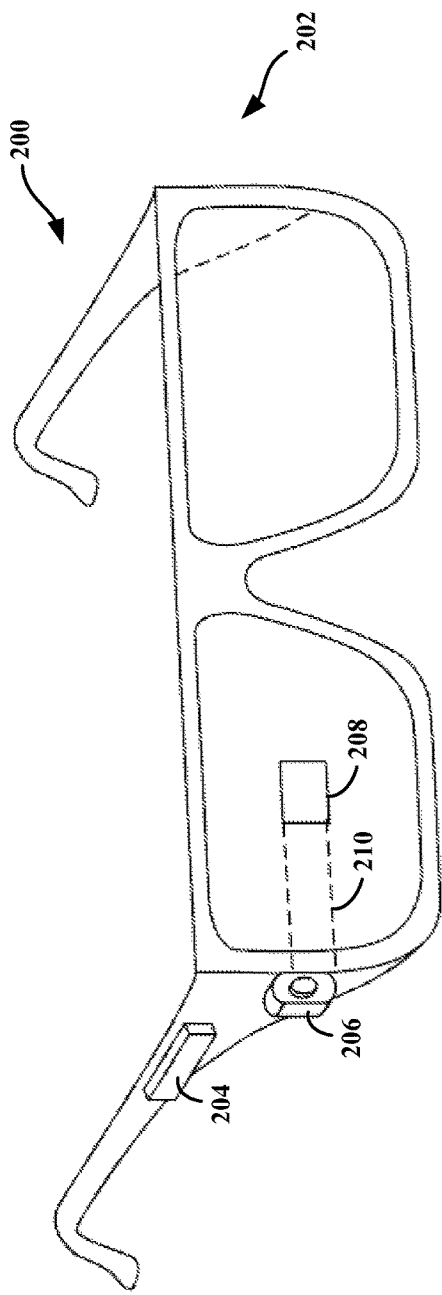
FIG. 2A shows an example system for receiving, transmitting, and displaying data.

FIG. 2A illustrates an example system 200 for receiving, transmitting, and displaying data. The system 200 is shown in the form of a wearable computing device 202. The wearable computing device 202 may include frame elements and side-arms such as those described with respect to FIGS. 1A and 1B. The wearable computing device 202 may additionally include an on-board computing system 204 and a video camera 206, such as those described with respect to FIGS. 1A and 1B. The video camera 206 is shown mounted on a frame of the wearable computing device 202; however, the video camera 206 may be mounted at other positions as well.

As shown in FIG. 2A, the wearable computing device 202 may include a single display 208 which may be coupled to the device. The display 208 may be formed on one of the lens elements of the wearable computing device 202, such as a lens element described with respect to FIGS. 1A and 1B, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 2B:
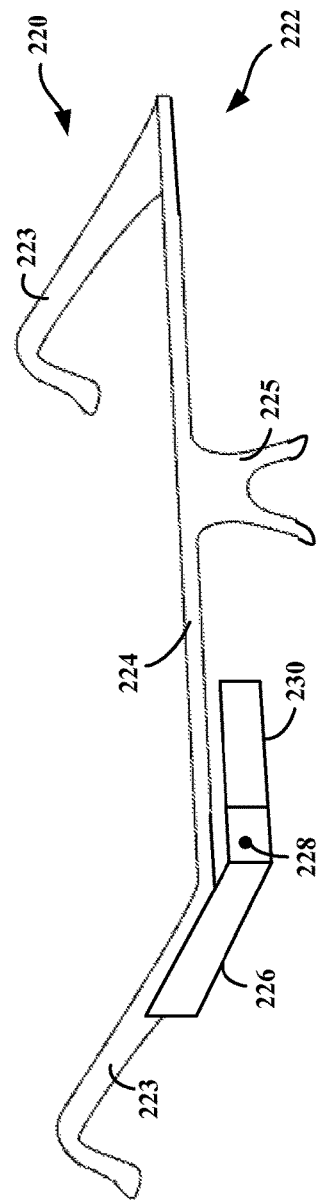
FIG. 2B shows an example system for receiving, transmitting, and displaying data.

FIG. 2B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 2B, the center frame support 224 connects the side-arms 223. The wearable computing device 222 does not include lens-frames containing lens elements. The wearable computing device 222 may additionally include an on-board computing system 226 and a video camera 228, such as those described with respect to FIGS. 1A and 1B.

The wearable computing device 222 may include a single lens element 230 that may be coupled to one of the side-arms 223 or the center frame support 224. The lens element 230 may include a display such as the display described with reference to FIGS. 1A and 1B, and may be configured to overlay computer-generated graphics upon the user's view of the physical world. In one example, the single lens element 230 may be coupled to a side of the extending side-arm 223. The single lens element 230 may be positioned in front of or proximate to a user's eye when the wearable computing device 222 is worn by a user. For example, the single lens element 230 may be positioned below the center frame support 224, as shown in FIG. 2B.

2. EXAMPLE METHODS

Figure 3:
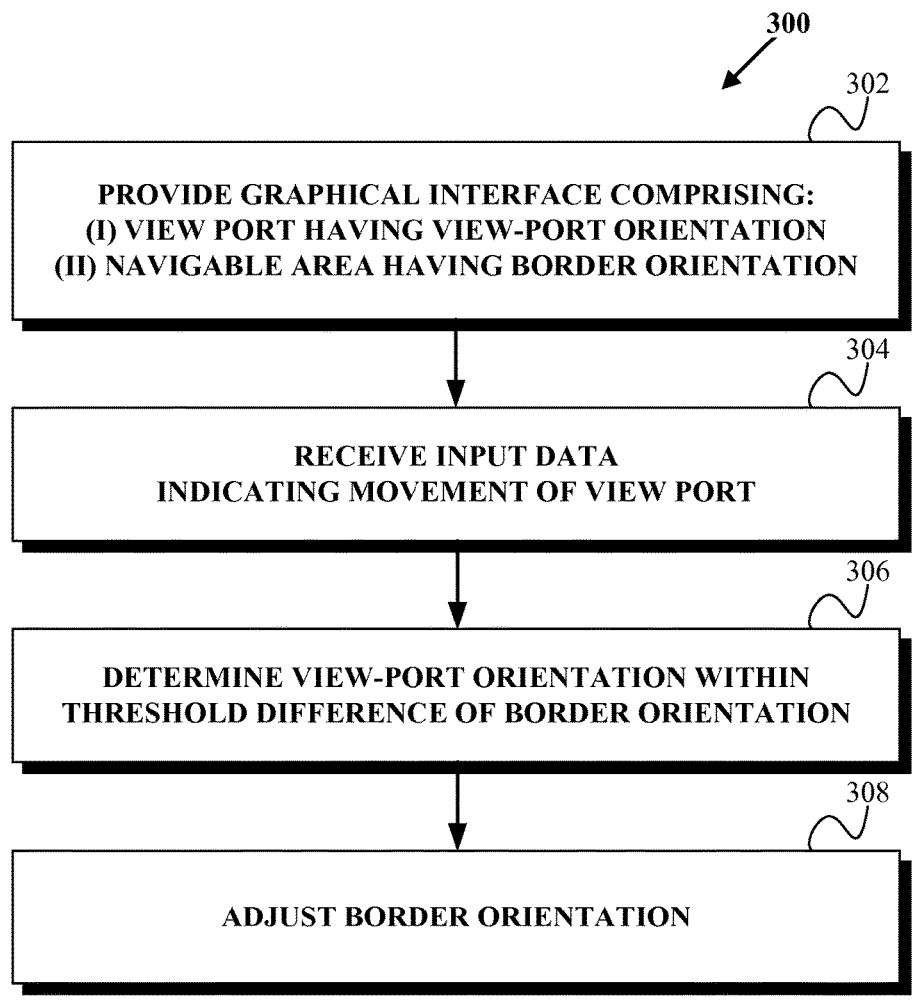
FIG. 3 shows a flowchart depicting an example method for adjusting border orientations.

FIG. 3 shows a flowchart depicting an example method for adjusting border orientations. Method 300 is described, by way of example, as being carried out by a wearable computer and, in particular, by a wearable computer that includes an HMD. However, it should be understood that example methods, such as method 300, may be carried out by devices other than a wearable computer, and/or may be carried out by sub-systems in a wearable computer or in other devices. For example, the example method may alternatively be carried out by a device such as a mobile phone, which is configured to simultaneously display a view port within a navigable area of a graphical interface. Other examples are also possible.

Furthermore, those skilled in the art will understand that the flowchart described herein illustrates functionality and operation of certain implementations of example embodiments. In this regard, each block of the flowchart may represent a module, a segment, or a portion of program code, which includes one or more instructions executable by a processor (e.g., processor 1102 described below with respect to system 1100) for implementing specific logical functions or steps in the process. The program code may be stored on any type of computer readable medium (e.g., computer readable storage medium or non-transitory media, such as memory 1104 or storage device 1106 described below with respect to system 1100), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

An example method may be used to allow a user to navigate, via head movements, throughout the navigable area via the view port. The navigable area may generally be "larger" than the view port. In turn, the graphical interface may generally be "larger" than the navigable area.

Example method 300 involves, as shown by block 302, causing a head-mounted display (HMD) to provide a graphical interface, the graphical interface comprising (i) a view port having a view-port orientation and (ii) at least one navigable area having at least one border, the at least one border having a first border orientation. At block 304, the HMD receives input data that indicates movement of the view port towards the at least one border. At block 306, the HMD determines that the view-port orientation is within a predetermined threshold distance from the first border orientation. And at block 308, based on at least the determination that the view-port orientation is within a predetermined threshold distance from the border orientation, the HMD adjusts the border orientation from the first border orientation to a second border orientation. Each of these blocks are discussed further below.

a. Provide Graphical Interface Comprising
  (i) View Port Having View-Port Orientation
  (ii) Navigable Area Having Border Orientation At block 302, method 300 involves causing a HMD to provide a graphical interface, the graphical interface including (i) a view port having a view-port orientation and (ii) at least one navigable area having at least one border, the at least one border having a first border orientation. The view port, navigable area, and graphical interface may be displayed via a graphical display of the HMD.

Figure 4A:
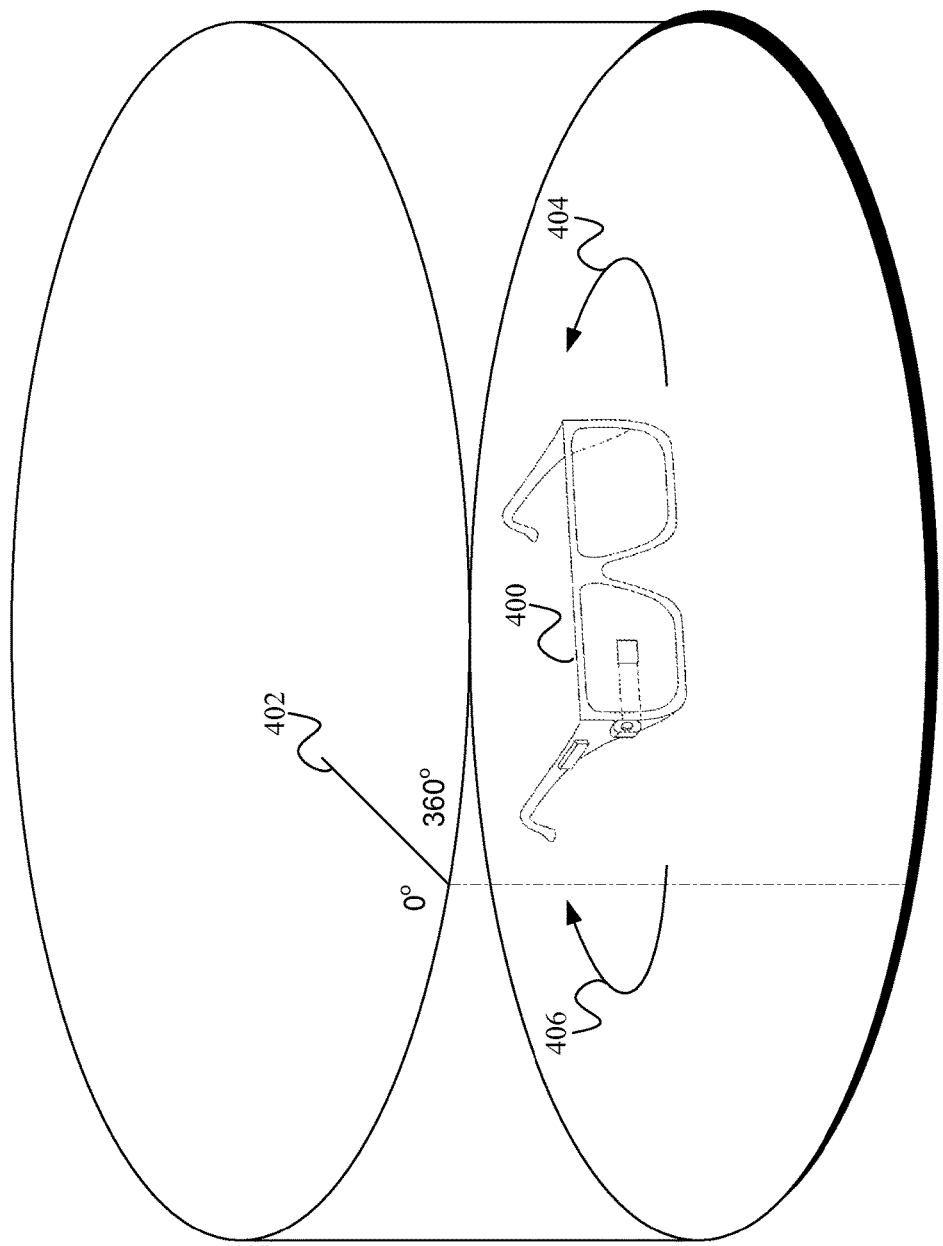
FIG. 4A shows an example, movable, head-mounted display (HMD).

With respect to FIG. 4A, example HMD 400 is shown. HMD 400 may take the form of any of those wearable-computing systems discussed above with respect to FIGS. 1A-1B and FIGS. 2A-2B. HMD 400 may take other forms as well. It should be understood that example HMD 400 is show for purposes of example and explanation only, and should not be taken to be limiting.

FIG. 4A demonstrates that HMD 400 is rotatable in real space 360 degrees throughout at least one plane. For example, when worn by the user, HMD 400 may be rotated left 404, by the user turning his/her head and/or body to the left. As another example, when worn by the user, HMD 400 may be rotated to the right 406, by the user turning his/her head and/or body to the right. While HMD 400 is shown as rotatable throughout one plane, when worn by a user, HMD 400 may also be rotatable in any other plane, axis, and/or direction. Graphical interface 402 indicates that a 360 degree virtual interface that surrounds a user may be provided, or otherwise available, to the user.

Figure 4B:
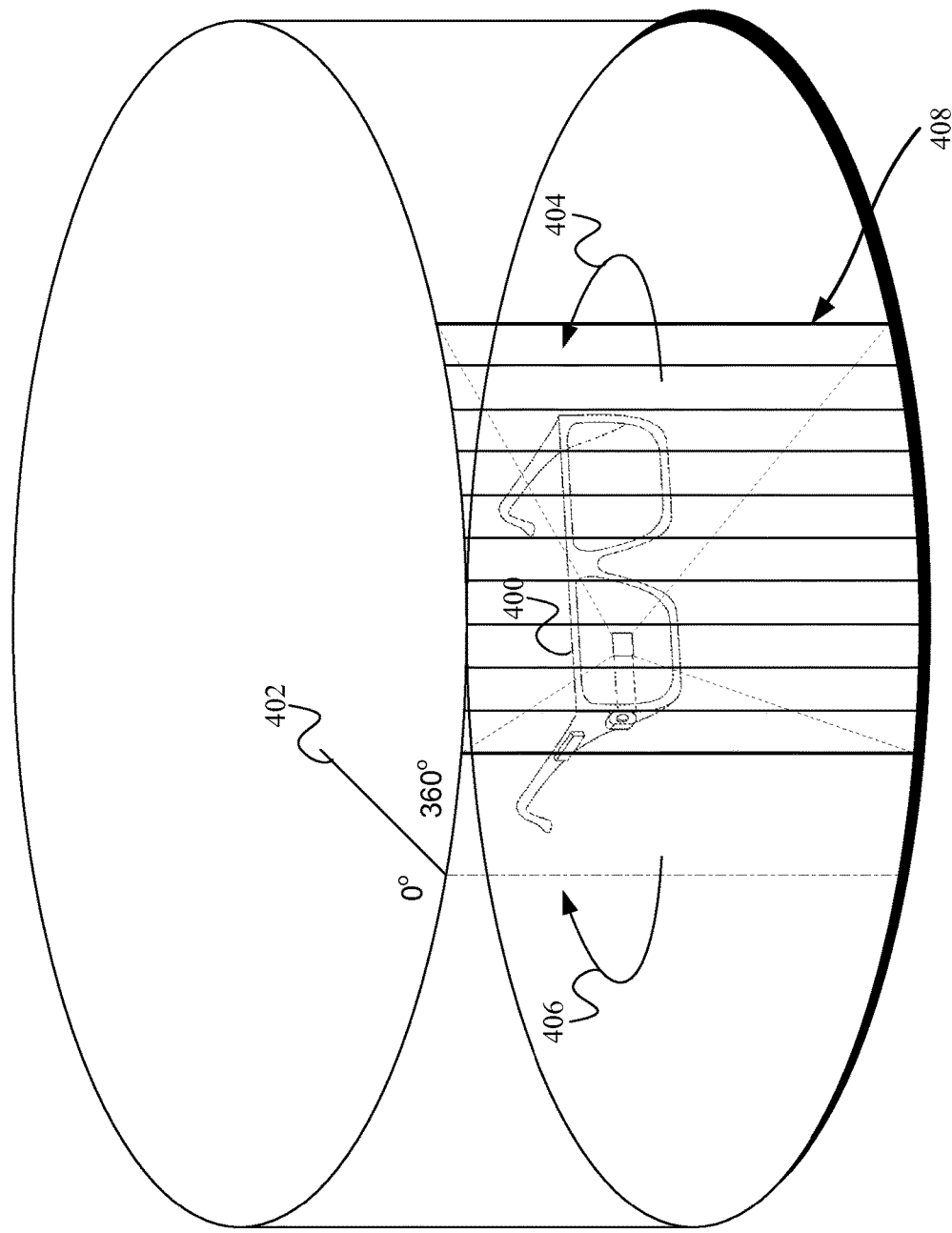
FIG. 4B shows the example HMD of FIG. 4A and an example view port.

FIG. 4B demonstrates that HMD 400 may display a view port 408, which view port 408 may be a virtual display overlaid on the user's real-world view, and which view port 408 may provide a view of a portion of 360 degree graphical interface 402. View port 408 may be movable throughout 360 degree graphical interface 402 in accordance with a rotation of HMD 400.

Figure 4C:
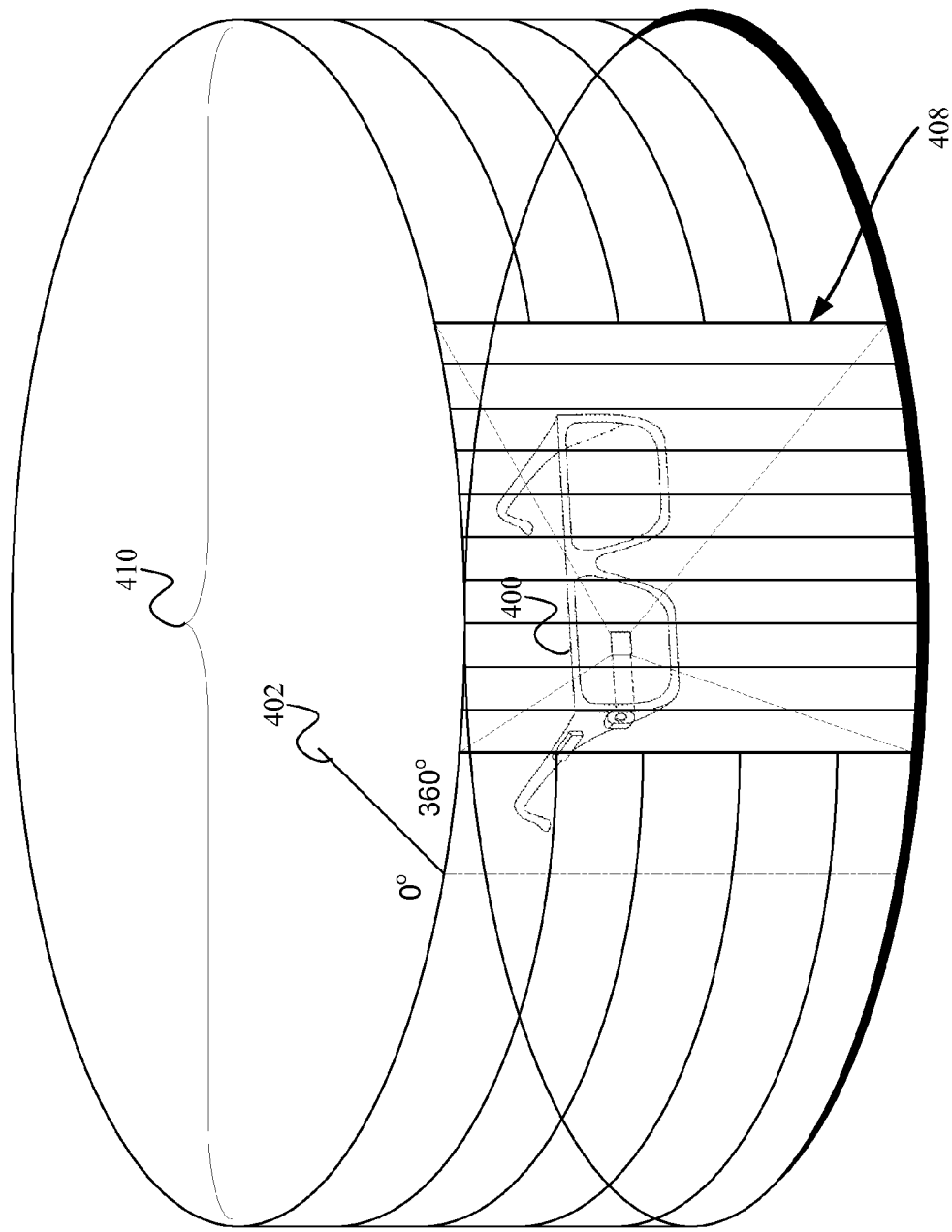
FIG. 4C shows the example HMD of FIG. 4A and an example navigable area.

In some embodiments, less than the full 360 degrees of graphical interface 402 may contain content that is of interest to the user. FIG. 4C demonstrates that, for example, graphical interface 402 may include a navigable area 410 that is only half, or 180 degrees, of the full 360 degrees of graphical interface 402. Navigable area 410 may contain content that is of interest to the wearer of HMD 400, while the rest of graphical interface 402 may not. Accordingly, the user may pan view port 408 throughout navigable area 410 to view, and otherwise interact with, the content within navigable area 410.

Figure 5:
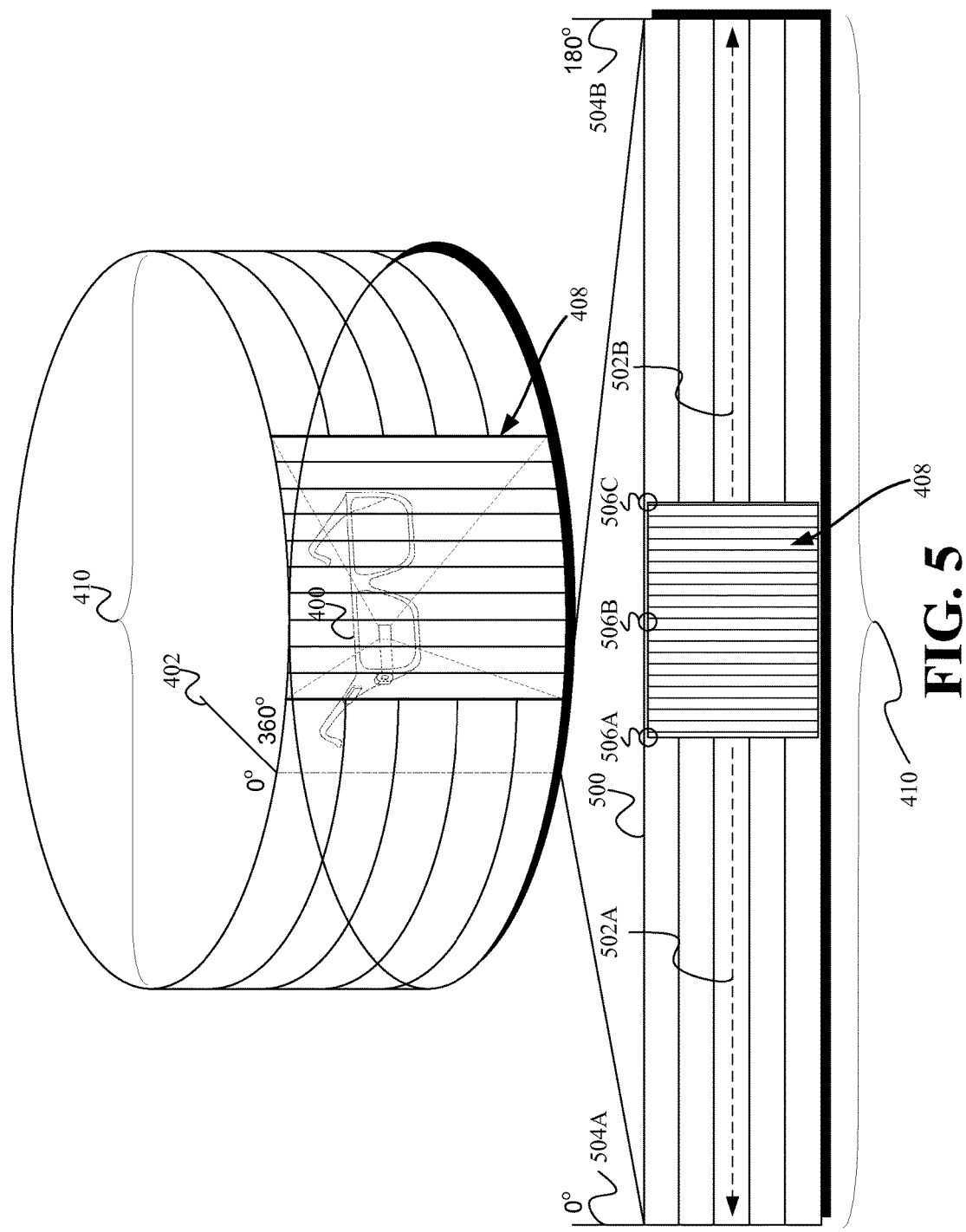
FIG. 5 shows the example HMD of FIGS. 4A-4C and a linear representation of the view port within a navigable area.

For purposes of explanation, FIG. 5 shows a two-dimensional representation 500 of navigable area 410 and view port 408. As indicated by left arrow 502A and right arrow 502B, view port 408 may be moved left and/or right throughout navigable area 410.

Further, navigable area 410 is shown as having left border 504A and right border 504B. Left border 504A is shown as having a border orientation of 0 degrees. On the other hand, right border 405B is shown as having a border orientation of 180 degrees.

Similarly, view port 408 may have a view-port orientation. The view-port orientation may be based on the location of any single portion, point, or pixel of view port 408. For example, the view-port orientation may be based on the center 506B of view port 408. In the example shown, center view-port orientation 506B may be 90 degrees (as view port 408 is currently located at the center of navigable area 410). As another example, the view-port orientation may be based on the left edge 506A of view port 408. In the example shown, left view-port orientation 506A may be some orientation between 0 degrees and 90 degrees. As another example still, the view-port orientation may be based on the right edge 506C of view port 408. In the example shown, right view-port orientation 506C may be some orientation between 90 degrees and 180 degrees.

b. Receive Input Data Indicating Movement of View Port

At block 304, method 300 involves receiving input data that indicates movement of the view port towards the at least one border. In an embodiment, the input data may include head-movement data and/or eye-movement data indicating a movement of the HMD.

Figure 6:
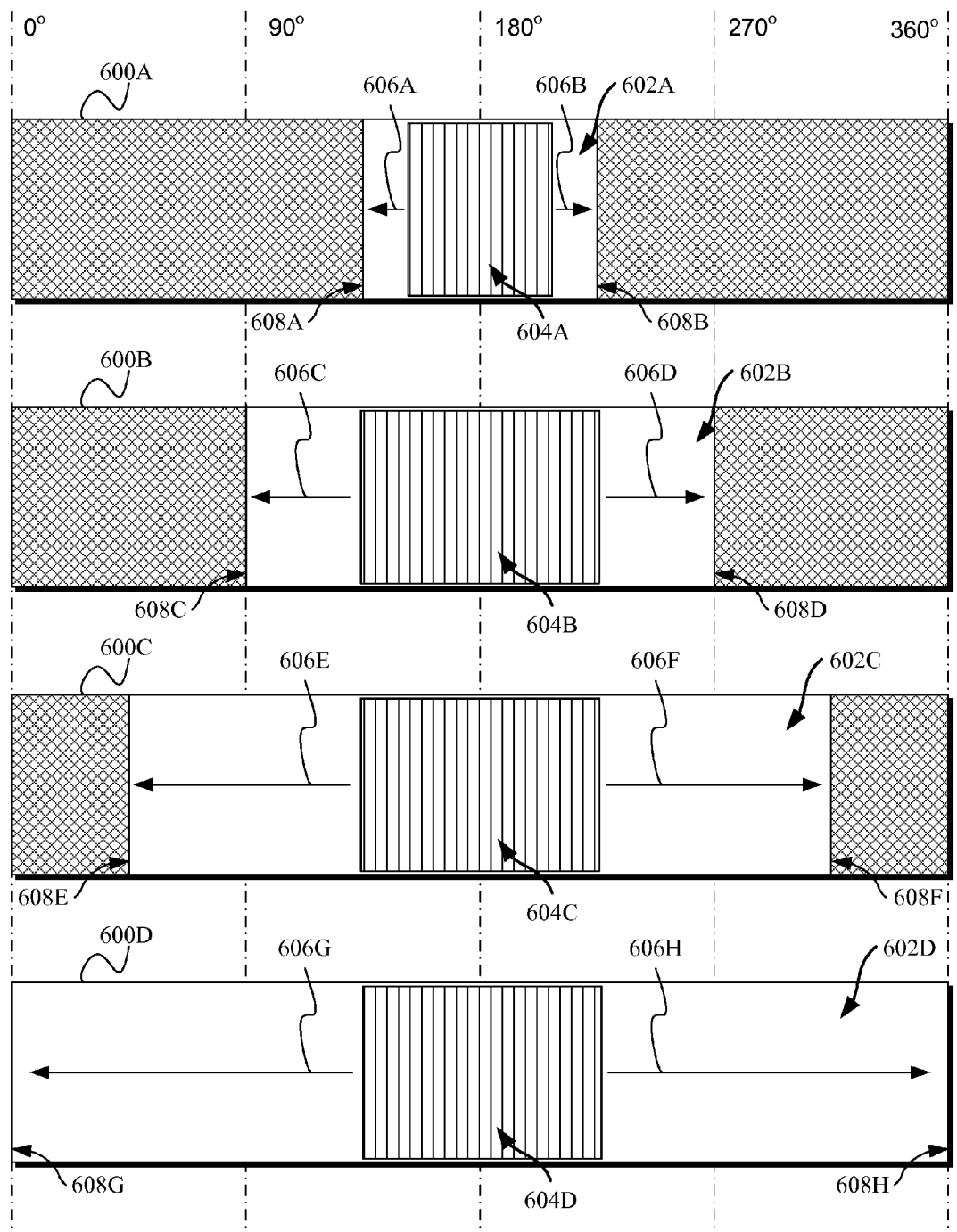
FIG. 6 shows a view port within a variety of example navigable areas of a graphical interface.

For purposes of explanation of movement of the view port towards a border of a navigable area, FIG. 6 shows a view port within a variety of possible example navigable areas of a graphical interface. More particularly, FIG. 6 shows a variety of graphical interfaces 600A-600D. Each of graphical interfaces 600A-600D has a span of 360 degrees. Further each of graphical interfaces 600A-600D contains a respective navigable area. It is of note that, in accordance with the disclosure herein, the graphical interface, navigable area, and view port may take any suitable form, including a form not explicitly described herein. That is, without limitation, the graphical interface, navigable area, and/or view port may take other shapes and/or sizes than those shown herein.

As one example, graphical interface 600A contains navigable area 602A. Navigable area 602A is shown as having a span of 90 degrees within graphical interface 600A. View port 604A is movable within navigable area 602A either left 606A or right 606B. Navigable area 600A has a first border 608A having an orientation of 135 degrees. Navigable area 600A also has a second border 608B having an orientation of 225 degrees. Thus, view port 604A is movable towards either of first border 608A and second border 608B.

As another example, graphical interface 600B contains navigable area 602B. Navigable area 602B is shown as having a span of 180 degrees within graphical interface 600B. View port 604B is movable within navigable area 602B either left 606C or right 606D. Navigable area 600B has a first border 608C having an orientation of 90 degrees. Navigable area 600B also has a second border 608D having an orientation of 270 degrees. Thus, view port 604B is movable towards either of first border 608C and second border 608D.

As yet another example, graphical interface 600C contains navigable area 602C. Navigable area 602C is shown as having a span of 270 degrees within graphical interface 600C. View port 604C is movable within navigable area 600C either left 606E or right 606F. Navigable area 600C has a first border 608E having an orientation of 45 degrees. Navigable area 600C also has a second border 608F having an orientation of 315 degrees. Thus, view port 604C is movable towards either of first border 608E and second border 608F.

Figure 7:
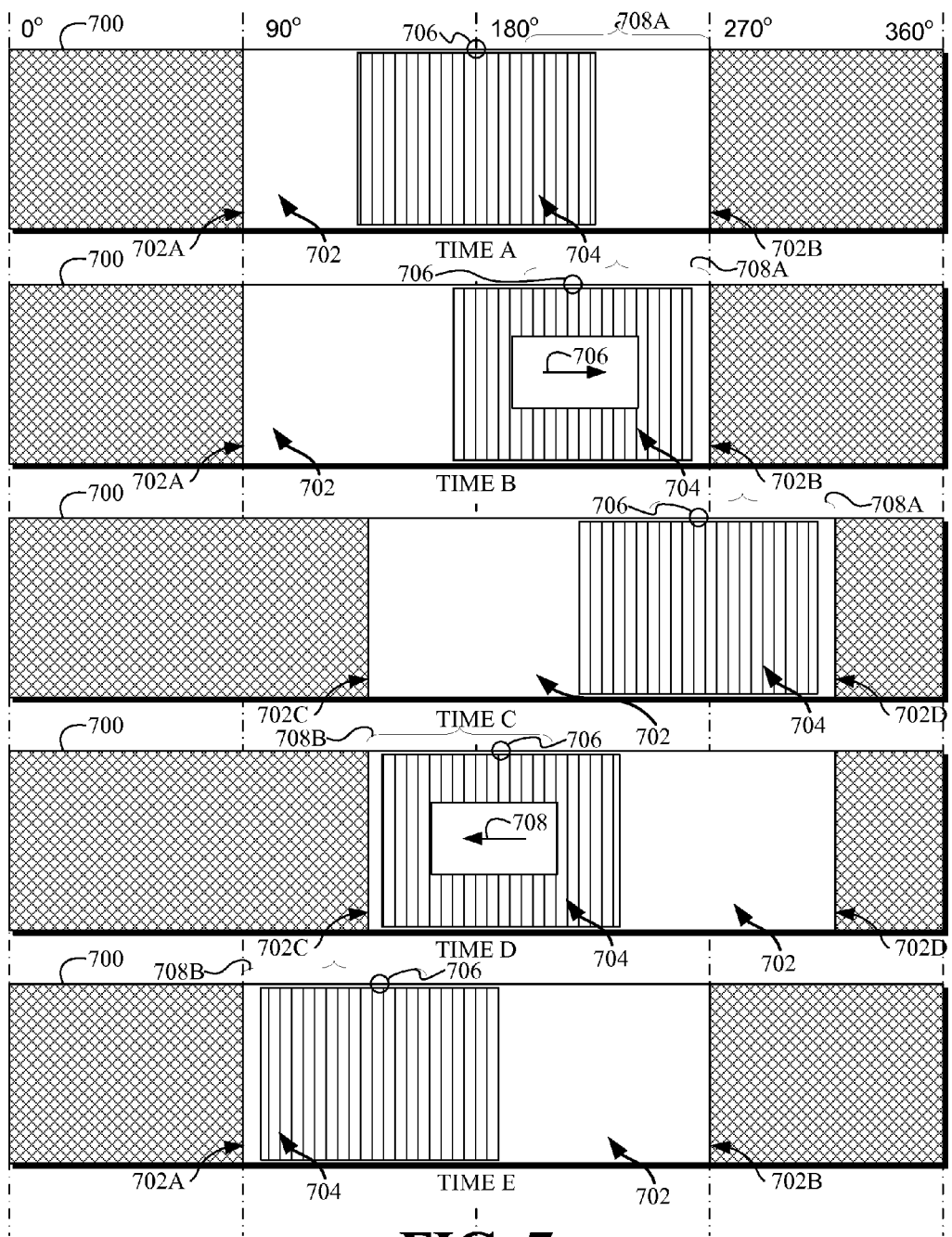
FIG. 7 shows a view port within an example navigable area having a variety of orientations within a graphical interface.

As yet another example still, graphical interface 600D contains navigable area 602D. Navigable area 602D is shown as having a span of 360 degrees within graphical interface 600D (i.e., the entirety of graphical interface 600D). View port 604D is movable within navigable area 602D either left 606G or right 606H. Navigable area 600D has a first border 608G having an orientation of 0 degrees. Navigable area 600D also has a second border 608H having an orientation of 360 degrees. Thus, view port 604D is movable towards either of first border 608G and 608H.

c. Determine View-Port Orientation Within Threshold Difference Of Border Orientation At block 306, method 300 involves determining that the view-port orientation is within a predetermined threshold distance from the first border orientation. FIG. 7 shows a view port 704 within a navigable area 702 having a variety of orientations within a graphical interface 700 at five different points in time, Time A-Time E.

More specifically, at Time A, navigable area 702 has a left-border orientation 702A at 90 degrees and a right-border orientation 702B at 270 degrees, corresponding to a total viewing span of 180 degrees within 360 degree graphical interface 700. View port 704 is stationary within navigable area 702 and centered within navigable area 702 with a view-port orientation 706 of 180 degrees. View-port orientation 706 is not within threshold distance 708A of right-border orientation 702B. That is, view port orientation 706 falls outside of threshold distance 708A of right-border orientation 702B.

At later Time B, navigable area 702 has the same left border orientation 702A at 90 degrees and a right-border orientation 702B at 270 degrees. However, view port 704 is shown as moving towards the right border, as indicated by arrow 706. Further, view-port orientation 706 has shifted towards the right border and view-port orientation 706 is now within threshold distance 708A of right-border orientation 702B. Accordingly, a determination may be made that the view-port orientation is within a predetermined threshold distance from the first border orientation.

d. Adjust Border Orientation

At block 308, method 300 involves, based on at least the determination that the view-port orientation is within a predetermined threshold distance from the border orientation, adjusting the border orientation from the first border orientation to a second border orientation.

Again, with reference to FIG. 7, at Time C, navigable area 702 now has left-border orientation 702C, which is at some orientation to the right of left-border orientation 702A. Similarly, navigable area 702 has right-border orientation 702D, which is at some orientation to the right of the right-border orientation 702B. Nonetheless, navigable area 702 has maintained a total view span of 180 degrees. Thus, navigable area 702 has effectively been "shifted" right based on the determination that view-port orientation 706 came within threshold distance 708A of the right border of navigable area 702.

In accordance with block 308, the border orientation may be adjusted to a second border orientation according to any suitable criteria. For example, adjusting the border orientation may involve setting the border orientation equal to the view-port orientation. With respect to the example shown in FIG. 7 at Time C, such an approach may be particularly suitable when the view-port orientation is aligned with the right edge of view port 704. In this way, the right edge of view port 704 may never move past (to the right) of the right edge of navigable area 702. Indeed, as view port 704 is moved to the right, so too will navigable area 702 move to the right.

As another example, adjusting the border orientation may involve setting the border orientation equal to a predetermined difference from the view-port orientation. With respect to the example shown in FIG. 7 at Time C, it can be seen that the distance between view-port orientation 706 and right-border orientation 702D is equal to, at Time B, the distance between view-port orientation 706 and right-border orientation 702B. In this way, the right edge of view port 704 may never move past (to the right) of the right edge of navigable area 702. Indeed, as view port 704 is moved to the right, so too will navigable area 702 move to the right. At the same time, a "buffer" of space may be maintained between the right edge of view port 704 and the right edge of navigable area 702.

As shown with respect to Time D and Time E, not only may block 308 involve adjusting a border orientation to the right—the border orientation may also be adjusted to the left. More specifically, at Time D, navigable area 702 has left border orientation 702C and right-border orientation 702D. However, view port 704 is shown as moving towards the left border, as indicated by arrow 708. Further, view-port orientation 706 has shifted towards the left border such that view-port orientation 706 is now within threshold distance 708B of left-border orientation 702C.

At later Time E, navigable area 702 has left-border orientation 702A, which is at an orientation to the left of left-border orientation 702C. Similarly, navigable area 702 has right-border orientation 702B, which is at an orientation to the left of right-border orientation 702D. Nonetheless, navigable area 702 has maintained a total view span of 180 degrees. Thus, navigable area 702 has effectively been "shifted" left based on the determination that view-port orientation 706 came within threshold distance 708B.

In an embodiment, adjusting the orientation of a border may involve, before adjusting the orientation of the border, determining that a movement speed of the view port exceeds a predetermined movement-speed threshold. In such an embodiment, a speed parameter may map a given amount of input movement (e.g., head movement) to an amount of view port movement. More specifically, the sensitivity of the view port may be configured in terms of counts per inch (CPI), which includes the number of counts for the view port to move one inch (or one degree, or other suitable measure of distance) on the graphical interface. The movement-speed threshold may be set, for example, to a given CPI such that if the speed of movement of the view port does not exceed the threshold CPI, the position of the navigable area may not be changed. However, if the speed of movement of the view port exceeds the threshold CPI, the position of the navigable area may be changed.

In another embodiment, adjusting the orientation of the border may involve, before adjusting the orientation of the border, determine that a movement speed of the view port does not exceed a predetermined movement-speed threshold. The movement-speed threshold may be set, for example, to a given CPI such that if the speed of movement of the view port does not exceed the threshold CPI, the position of the navigable area may be changed. However, if the speed of movement of the view port exceeds the threshold CPI, the position of the navigable area may not be changed.

Figure 8:
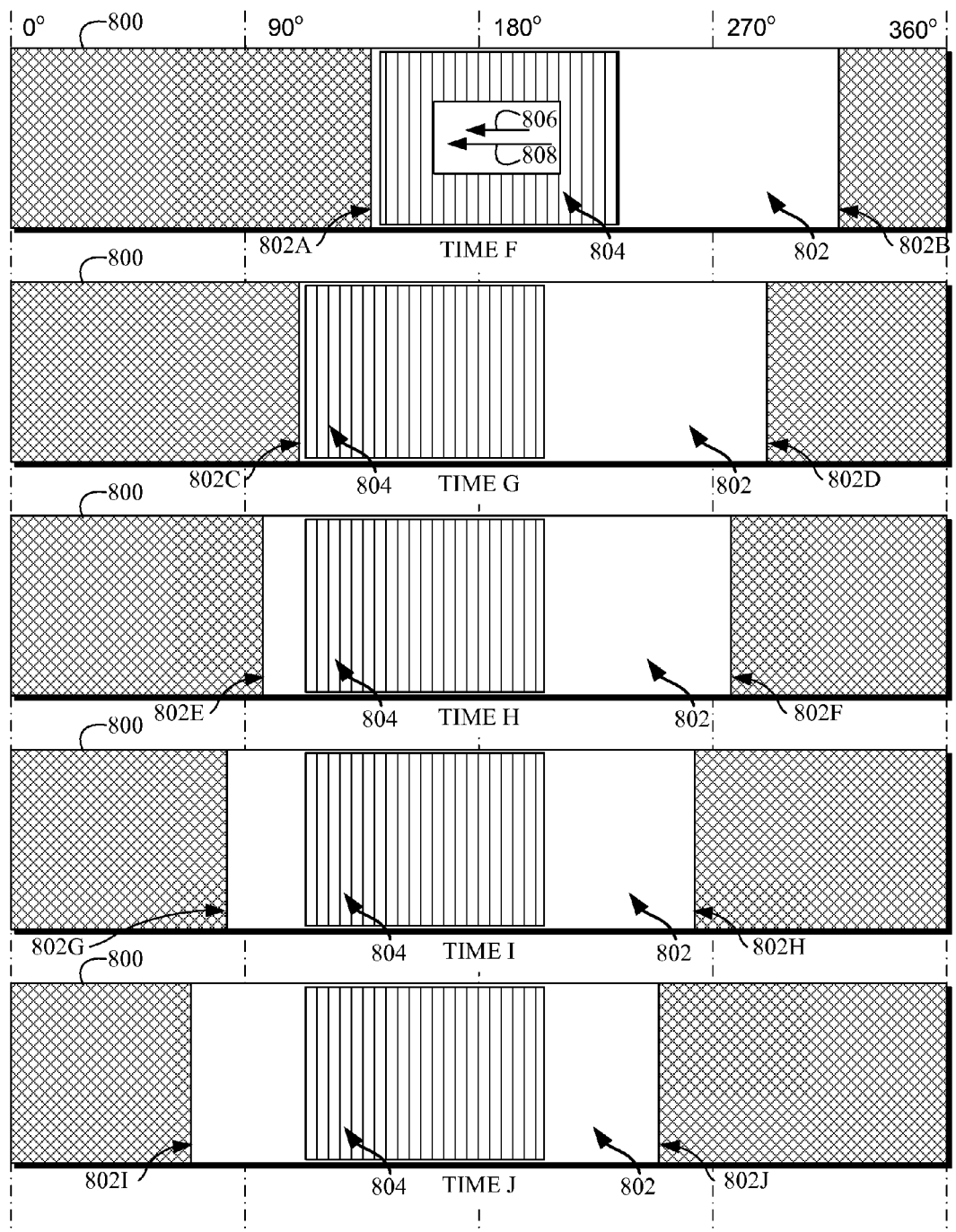
FIG. 8 shows another view port within an example navigable area having a variety of orientations within a graphical interface.

In yet another embodiment, adjusting the orientation of the border may involve providing a continuous visual indication of the border orientation adjusting from the first border orientation to the second border orientation. FIG. 8 shows a view port 804 within a navigable area 802 having a variety of orientations within a graphical interface 800 at five different points in time, Time F-Time J. As a general matter, navigable area 802 moves left during Time F to Time J. In between, Time F and Time J, at times G, H, and I, however, navigable area 802 is shown as continually moving. That is the left border of navigable area 802 is shown as moving from left-border orientation 802A at Time F, to left-border orientation 802C at Time G, to left-border orientation 802E at Time H, to left-border orientation 802G at Time I, and to left-border orientation 802I at Time J. Navigable area 802 may be shown at other positions between Time F and Time J as well. In this way, the continuous visual indication of navigable area 802 may provide a visual sensation of navigable area 802 "sliding" into place.

In yet another embodiment still, adjusting the orientation of the border may involve determining the second border orientation based on at least a movement speed of the view port. That is, while it was described above that the second border orientation may be set statically based on, for example, setting the border orientation equal to the view-port orientation or setting the border orientation equal to a predetermined difference from the view-port orientation, this is not necessary. The second border orientation may also be set in a dynamic manner based on at least the movement speed of the view port.

For purposes of explanation, consider that, at Time F, view port 804 is moving left with a first speed 806. First speed 806 may be relatively slow, and as such, left-border orientation 802A may be adjusted in a relatively unaffected manner. For instance, as shown in Time G, the left-border orientation may adjusted by setting the border orientation equal to the view-port orientation or setting the border orientation equal to a predetermined difference from the view-port orientation. Other examples may exist as well.

However, consider that, at Time F, view port 804 is moving left with a second speed 808, greater than first speed 806. Second speed 808 may be relatively fast, and as such, right-border orientation 802B may be adjusted in a relatively dramatic manner. For instance, as shown in Time H, the left-border orientation may be adjusted first to left-border orientation 802C at Time G, and then may continue to adjust to left-border orientation 802E at Time H. In this way, navigable area 802 may appear to "bounce" off view port 804 when view port 804 is moved left at speed 808 towards the left edge of navigable area 802. The amount of "bounce" may increase proportionally with increases in movement speed of the view port.

Alternatively, adjusting the orientation of the border may involve setting the border orientation equal to an orientation such that the view port is centered within the navigable area. For purposes of explanation, consider that, at Time F, view port 804 is moving left with a speed of either speed 806 or speed 808. Upon determining that an adjustment of the border orientation is required, the border orientation may be adjusted to that shown at Time J, corresponding to left-border orientation 8021. As depicted, left-border orientation 8021 corresponds to an orientation such that view port 804 is centered within navigable area 802.

Note that, upon recentering navigable area 802 in this manner, from Time F and Time J, navigable area 802 may be shown as continually moving. That is the left border of navigable area 802 is shown as moving from left-border orientation 802A at Time F, to left-border orientation 802C at Time G, to left-border orientation 802E at Time H, to left-border orientation 802G at Time I, and to left-border orientation 8021 at Time J. Navigable area 802 may be shown at other positions between Time F and Time J as well. In this way, the continuous visual indication of navigable area 802 may provide a visual sensation of navigable area 802 "sliding" into place, centered about view port 804.

In summary of some of the aspects of the example shown in FIG. 8, the graphical interface may be a recursive graphical interface (i.e., a 360 degree graphical interface). The graphical interface may include one navigable area. The navigable area may have a navigable span of 180 degrees, and the view port may have a viewing span of less than 180 degrees.

Thus far, embodiments containing just a single navigable area within a graphical interface have been discussed. However, it is possible that a graphical interface may contain multiple navigable areas. In such embodiments, the navigable areas may be separated by what are referred to herein as "soft borders." The soft borders may be configured such that the orientation of a given navigable area in a graphical interface having multiple navigable areas may be adjusted under some conditions. Under other conditions, however, the view port may be allowed to cross over a soft border from a first navigable area to a second navigable area.

Figure 9:
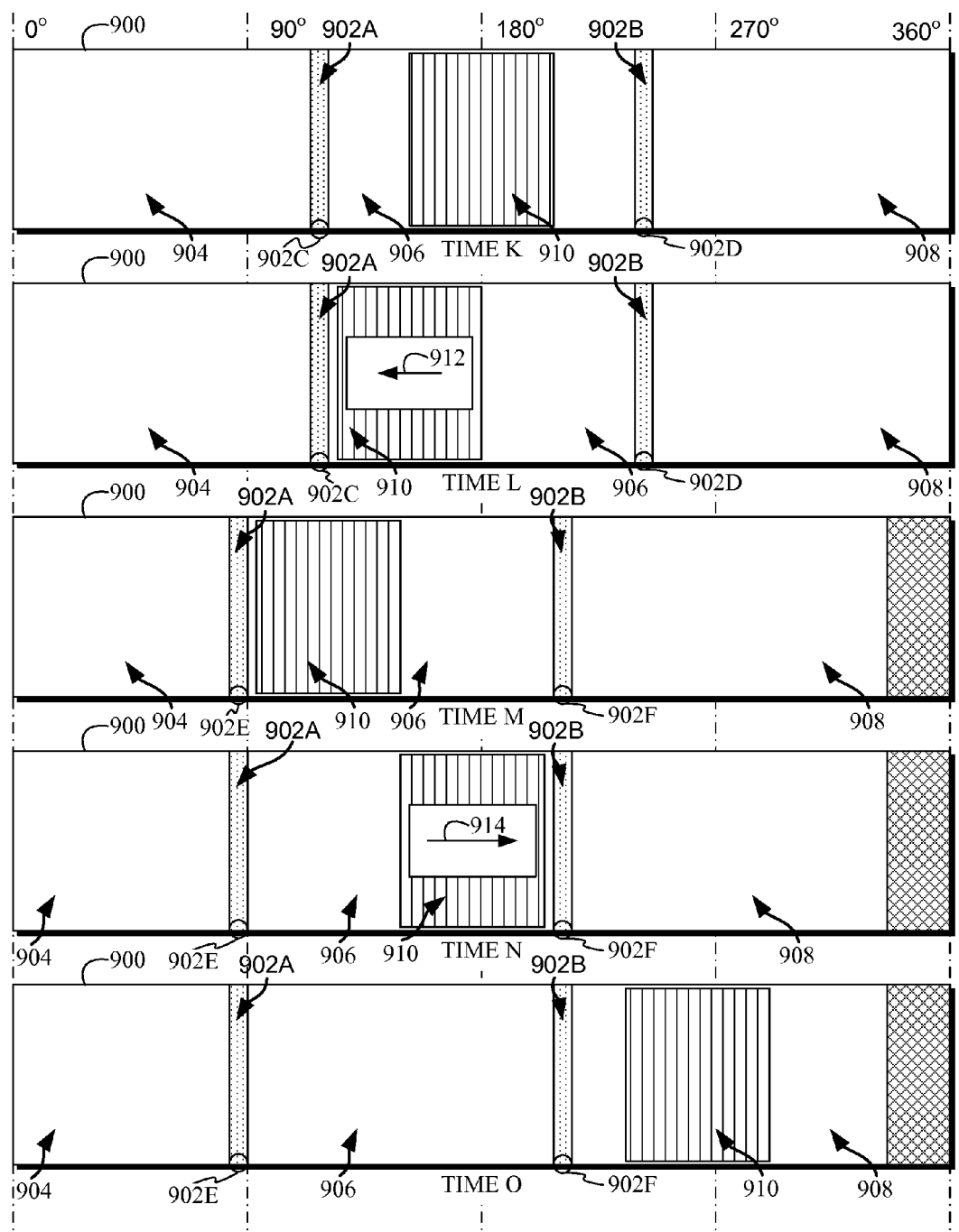
FIG. 9 shows a view port within a variety of additional example navigable areas of a graphical interface.

FIG. 9 shows a view port within a variety of additional navigable areas of a graphical interface. More particularly, FIG. 9 shows graphical interface 900 including three navigable areas 904, 906, and 908. Graphical interface 900 also includes view port 910.

At Time K, view port 910 is shown as stationary within navigable area 906. Navigable area 906 is separated on its left edge from navigable area 904 by soft border 902A. Navigable area 906 is separated in its right edge from navigable area 908 by soft border 902B. Each of soft borders 902A and 902B have a soft-border orientation. More particularly, Soft border 902A has a soft-border orientation 902C. Soft border 902B has a soft-border orientation 902D.

In an embodiment, a soft-border orientation may be adjusted. Adjusting a soft-border orientation may involve determining that (a) a movement speed of the view port does not exceed a predetermined movement-speed threshold and that (b) the view port orientation is within a predetermined threshold distance from the soft-border orientation; and based on at least the determination that (a) the movement speed does not exceed a predetermined movement-speed threshold and that (b) the view port orientation is within a predetermined threshold distance from the soft-border orientation, adjusting the soft-border orientation. In other words, if the view port approaches a soft border with a relatively slow movement speed, the soft-border orientation may be adjusted so that the view port stays within the navigable area it is currently within.

For purposes of explanation, at Time L, view port 910 is shown as moving left towards soft border 902A with a movement speed 912. Assume that movement speed 912 does not exceed the predetermined movement-speed threshold. Upon view port 910 coming within the predetermined threshold distance from soft-border orientation 902C, soft-border orientation 902C may be adjusted. For instance, as shown at later Time M, the soft-border orientation of soft border 902A has been adjusted to soft-border orientation 902E, to the left of soft-border orientation 902C.

Note that movement of navigable area 906 corresponds to a similar movement of navigable areas 904 and 908. That is, as a given navigable area of the graphical interface is moved, so too may other navigable areas of the graphical interface move.

Alternatively, a view port may be allowed to move from one navigable area to another navigable area. Moving the view port from one navigable area to another navigable area may involve determining that (a) the movement speed exceeds a predetermined movement-speed threshold and that (b) the view port orientation is within a predetermined threshold distance from the soft-border orientation; and based on at least the determination that (a) the movement speed exceeds a predetermined movement-speed threshold and that (b) the view port orientation is within a predetermined threshold distance from the soft-border orientation, causing the view port to enter the second navigable area. In other words, if the view port approaches a soft border with a relatively fast movement speed, the view port may cross the soft border and enter another navigable area.

For purposes of explanation, At Time N, view port 910 is shown as moving right towards soft border 902B with a movement speed 914. Assume that movement speed 914 exceeds the predetermined movement-speed threshold. Upon view port 910 coming within the predetermined threshold distance from soft-border orientation 902F, view port 910 may be allowed to cross soft border 902b, leave navigable area 906, and enter navigable area 908. For instance, as shown at later Time O, view port 910 is shown within navigable area 908.

In summary of some of the aspects of the example shown in FIG. 9 the graphical interface may be a recursive graphical interface (i.e., a 360 degree graphical interface). The graphical interface may include three navigable areas. Each of the navigable areas may have a navigable span of 120 degrees, and the view port may have a viewing span of less than 120 degrees.

Note, however, that while the example shown in FIG. 9 contains three navigable areas, this is not necessary. More generally, the graphical interface may include at least two navigable areas, the at least two navigable areas separated by a soft border, the soft border having a soft-border orientation. Thus any number of navigable areas may be possible, with the navigable areas each separated by a soft border.

3. EXAMPLE COMPUTING SYSTEM AND NETWORK ARCHITECTURE

Figure 10:
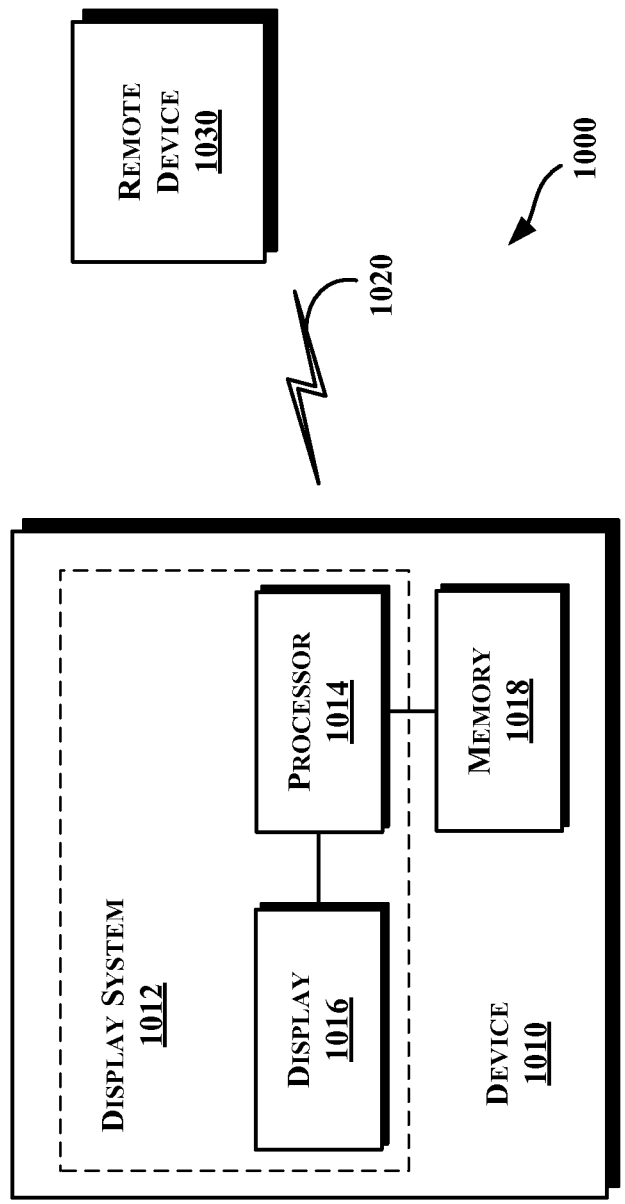
FIG. 10 shows a simplified block diagram of an example computer network infrastructure.

FIG. 10 shows a simplified block diagram of an example computer network infrastructure. In system 1000, a device 1010 communicates using a communication link 1020 (e.g., a wired or wireless connection) to a remote device 1030. The device 1030 may be any type of device that can receive data and display information corresponding to or associated with the data. For example, the device 1030 may be a heads-up display system, such as the head-mounted device 102, 200, or 220 described with reference to FIGS. 1A-2B.

Thus, the device 1010 may include a display system 1012 comprising a processor 1014 and a display 1016. The display 1016 may be, for example, an optical see-through display, an optical see-around display, or a video see-through display. The processor 1014 may receive data from the remote device 1030, and configure the data for display on the display 1016. The processor 1014 may be any type of processor, such as a micro-processor or a digital signal processor, for example.

The device 1010 may further include on-board data storage, such as memory 1018 coupled to the processor 1014. The memory 1018 may store software that can be accessed and executed by the processor 1014, for example.

The remote device 1030 may be any type of computing device or transmitter including a laptop computer, a mobile telephone, or tablet computing device, etc., that is configured to transmit data to the device 1010. The remote device 1030 and the device 1010 may contain hardware to enable the communication link 1020, such as processors, transmitters, receivers, antennas, etc.

In FIG. 10, the communication link 1020 is illustrated as a wireless connection; however, wired connections may also be used. For example, the communication link 1020 may be a wired serial bus such as a universal serial bus or a parallel bus, among other connections. The communication link 1020 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 1030 may be accessible via the Internet and may include a computing cluster associated with a particular web service (e.g., social-networking, photo sharing, address book, etc.).

Figure 11:
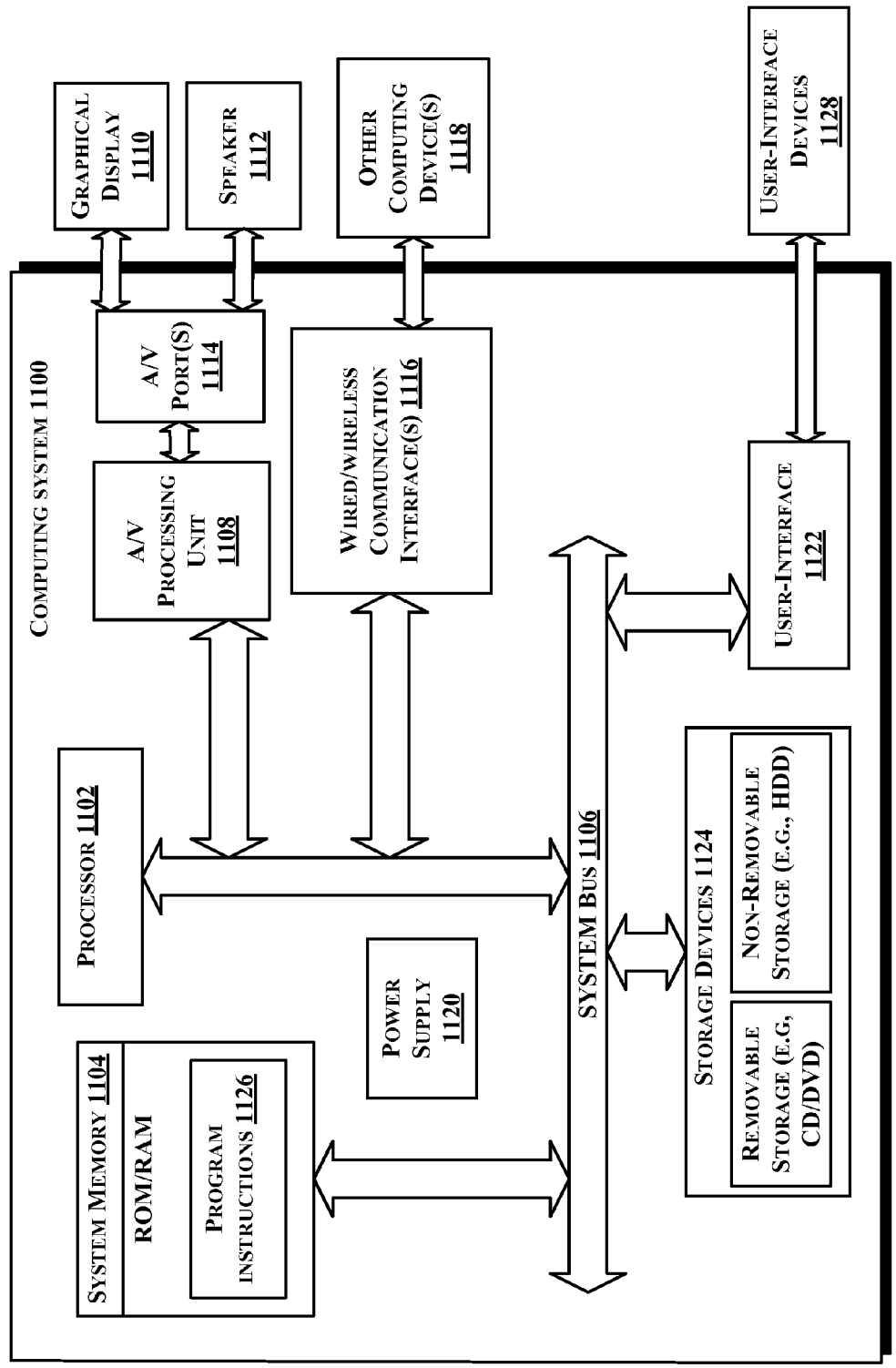
FIG. 11 shows a simplified block diagram depicting example components of an example computing system.

As described above in connection with FIGS. 1A-2B, an example wearable computing device may include, or may otherwise be communicatively coupled to, a computing system, such as computing system 118 or computing system 204. FIG. 11 shows a simplified block diagram depicting example components of an example computing system 1100. One or both of the device 1010 and the remote device 1030 may take the form of computing system 1100.

Computing system 1100 may include at least one processor 1102 and system memory 1104. In an example embodiment, computing system 1100 may include a system bus 1106 that communicatively connects processor 1102 and system memory 1104, as well as other components of computing system 1100. Depending on the desired configuration, processor 1102 can be any type of processor including, but not limited to, a microprocessor (μP), a microcontroller (μC), a digital signal processor (DSP), or any combination thereof. Furthermore, system memory 1104 can be of any type of memory now known or later developed including but not limited to volatile memory (such as RAM), non-volatile memory (such as ROM, flash memory, etc.) or any combination thereof.

An example computing system 1100 may include various other components as well. For example, computing system 1100 includes an A/V processing unit 1108 for controlling graphical display 1110 and speaker 1112 (via A/V port 1114), one or more communication interfaces 1116 for connecting to other computing devices 1118, and a power supply 1120. Graphical display 1110 may be arranged to provide a visual depiction of various input regions provided by user-interface module 1122. For example, user-interface module 1122 may be configured to provide a user-interface, such as the example user-interface described below in connection with FIGS. 12A-D, and graphical display 1110 may be configured to provide a visual depiction of the user-interface. User-interface module 1122 may be further configured to receive data from and transmit data to (or be otherwise compatible with) one or more user-interface devices 1128.

Furthermore, computing system 1100 may also include one or more data storage devices 1124, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 1100.

According to an example embodiment, computing system 1100 may include program instructions 1126 that are stored in system memory 1104 (and/or possibly in another data-storage medium) and executable by processor 1102 to facilitate the various functions described herein including, but not limited to, those functions described with respect to FIG. 3. Although various components of computing system 1100 are shown as distributed components, it should be understood that any of such components may be physically integrated and/or distributed according to the desired configuration of the computing system.

4. EXAMPLE USER-INTERFACE

FIGS. 12A-D show aspects of an example user-interface 1200. The user-interface 1200 may be displayed by, for example, a wearable computing device as described above for FIGS. 1A-2B.

Figure 12A:
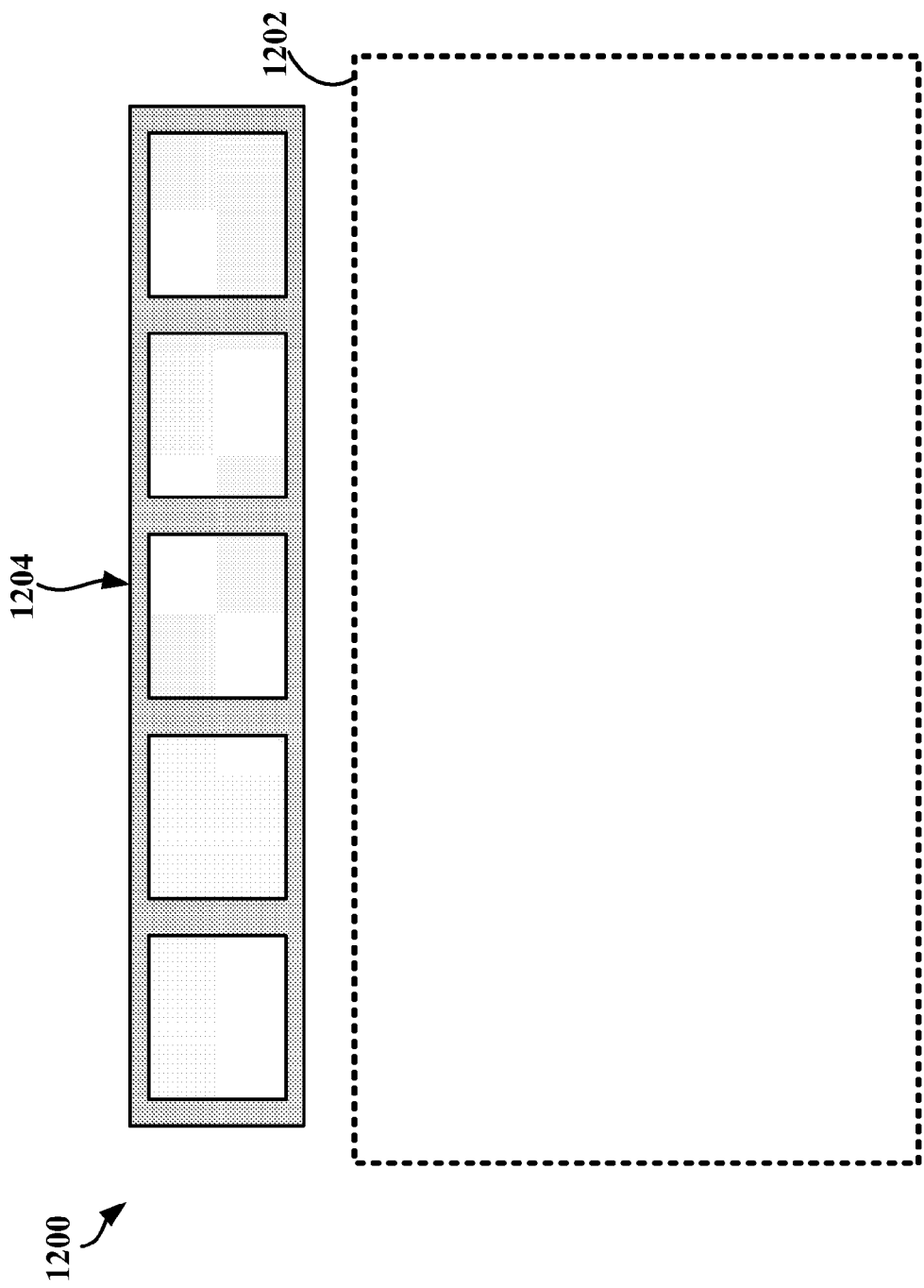
FIG. 12A shows aspects of an example user-interface.

An example state of the user-interface 1200 is shown in FIG. 12A. The example state shown in FIG. 12A may correspond to a first position of the wearable computing device. That is, the user-interface 1200 may be displayed as shown in FIG. 12A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 1200 includes a view port 1202. An example boundary of the view port 1202 is shown by a dotted frame. While the view port 1202 is shown to have a landscape shape (in which the view port 1202 is wider than it is tall), in other embodiments the view port 1202 may have a portrait or square shape, or may have a non-rectangular shape, such as a circular or elliptical shape. The view port 1202 may have other shapes as well.

The view port 1202 may be, for example, the viewable area between (or encompassing) the upper, lower, left, and right boundaries of a display on the wearable computing device. As shown, when the wearable computing device is in the first position, the view port 1202 is substantially empty (e.g., completely empty) of user-interface elements, such that the user's view of their real-world environment is generally uncluttered, and objects in the user's environment are not obscured.

In some embodiments, the view port 1202 may correspond to a field of view of a wearer of the wearable computing device, and an area outside the view port 1202 may correspond to an area outside the field of view of the wearer. In other embodiments, the view port 1202 may correspond to a non-peripheral portion of a field of view of a wearer of the wearable computing device, and an area outside the view port 1202 may correspond to a peripheral portion of the field of view of the wearer. In still other embodiments, the user-interface 1200 may be larger than or substantially the same as a field of view of a wearer of the wearable computing device, and the field of view of the wearer may be larger than or substantially the same size as the view port 1202. The view port 1202 may take other forms as well.

Accordingly, the portions of the user-interface 1200 outside of the view port 1202 may be outside of or in a peripheral portion of a field of view of a wearer of the wearable computing device. For example, as shown, a menu 1204 may be outside of or in a peripheral portion of the field of view of the user in the user-interface 1200. While the menu 1204 is shown to be not visible in the view port 1202, in some embodiments the menu 1204 may be partially visible in the view port 1202.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view port 1202 and the menu 1204 to move such that the menu 1204 becomes more visible in the view port 1202. For example, the wearable computing device may cause the view port 1202 to move upward and may cause the menu 1204 to move downward. The view port 1202 and the menu 1204 may move the same amount, or may move different amounts. In one embodiment, the menu 1204 may move further than the view port 1202. As another example, the wearable computing device may cause only the menu 1204 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 122 described above in connection with FIG. 1A. In some embodiments, the movement data may comprise a binary indication corresponding to the upward movement. In other embodiments, the movement data may comprise an indication corresponding to the upward movement as well as an extent of the upward movement. The movement data may take other forms as well.

FIG. 12B shows aspects of an example user-interface after receiving movement data corresponding to an upward movement. As shown, the user-interface 1200 includes the view port 1202 and the menu 1204.

As noted above, in response to receiving the movement data corresponding to an upward movement of the wearable computing device, the wearable computing device may move one or both of the view port 1202 and the menu 1204 such that the menu 1204 becomes more visible in the view port 1202.

As shown, the menu 1204 is fully visible in the view port 1202. In other embodiments, however, only a portion of the menu 1204 may be visible in the view port 1202. In some embodiments, the extent to which the menu 1204 is visible in the view port 1202 may be based at least in part on an extent of the upward movement.

Thus, the view port 1202 may be moved in response to receiving data corresponding to an upward movement. In some embodiments, the view port 1202 may be moved in an upward scrolling or panning motion. For instance, the view port 1202 may appear to a wearer of the wearable computing device as if mapped onto the inside of a static sphere centered at the wearable computing device, and movement of the view port 1202 may map onto movement of the real-world environment relative to the wearable computing device. A speed, acceleration, and/or magnitude of the upward scrolling may be based at least in part on a speed, acceleration, and/or magnitude of the upward movement. In other embodiments, the view port 1202 may be moved by, for example, jumping between fields of view. In still other embodiments, the view port 1202 may be moved only when the upward movement exceeds a threshold speed, acceleration, and/or magnitude. In response to receiving data corresponding to an upward movement that exceeds such a threshold or thresholds, the view port 1202 may pan, scroll, slide, or jump to a new field of view. The view port 1202 may be moved in other manners as well.

While the foregoing description focused on upward movement, it is to be understood that the wearable computing device could be configured to receive data corresponding to other directional movement (e.g., downward, leftward, rightward, etc.) as well, and that the view port 1202 may be moved in response to receiving such data in a manner similar to that described above in connection with upward movement.

As shown, the menu 1204 includes a number of content objects 1206. In some embodiments, the content objects 1206 may be arranged in a ring (or partial ring) around and above the head of a wearer of the wearable computing device. In other embodiments, the content objects 1206 may be arranged in a dome-shape above the wearer's head. The ring or dome may be centered above the wearable computing device and/or the wearer's head. In other embodiments, the content objects 1206 may be arranged in other ways as well.

The number of content objects 1206 in the menu 1204 may be fixed or may be variable. In embodiments where the number is variable, the content objects 1206 may vary in size according to the number of content objects 1206 in the menu 1204. In embodiments where the content objects 1206 extend circularly around a wearer's head, like a ring (or partial ring), only some of the content objects 1206 may be visible at a particular moment. In order to view other content objects 1204, a wearer of the wearable computing device may interact with the wearable computing device to, for example, rotate the content objects 1206 along a path (e.g., clockwise or counterclockwise) around the wearer's head. To this end, the wearable computing device may be configured to receive data indicating such an interaction through, for example, a touch pad, such as finger-operable touch pad 124. Alternatively or additionally, the wearable computing device may be configured to receive such data through other input devices as well.

Depending on the application of the wearable computing device, the content objects 1206 may take several forms. For example, the content objects 1206 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 1206 may take other forms as well.

In embodiments where the content objects 1206 include tools, the tools may be located in a particular region of the menu 1204, such as the center. In some embodiments, the tools may remain in the center of the menu 1204, even if the other content objects 1206 rotate, as described above. Tool content objects may be located in other regions of the menu 1204 as well.

The particular content objects 1206 that are included in menu 1204 may be fixed or variable. For example, the content objects 1206 may be preselected by a wearer of the wearable computing device. In another embodiment, the content objects 1206 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 1206 may fixed, while the content objects 1206 may be variable. The content objects 1206 may be selected in other manners as well.

Similarly, an order or configuration in which the content objects 1206 are displayed may be fixed or variable. In one embodiment, the content objects 1206 may be pre-ordered by a wearer of the wearable computing device. In another embodiment, the content objects 1206 may be automatically ordered based on, for example, how often each content object 1206 is used (on the wearable computing device only or in other contexts as well), how recently each content object 1206 was used (on the wearable computing device only or in other contexts as well), an explicit or implicit importance or priority ranking of the content objects 1206, and/or other criteria.

In some embodiments, the wearable computing device may be further configured to receive from the wearer a selection of a content object 1206 from the menu 1204. To this end, the user-interface 1200 may include a cursor 1208, shown in FIG. 12B as a reticle, which may be used to navigate to and select content objects 1206 from the menu 1204. In some embodiments, the cursor 1208 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 122, or may be included in a peripheral device communicatively coupled to the wearable computing device. As another example, the selection data may be (or may be derived from) data received from a touch pad, such as the finger-operable touch pad 124 described above in connection with FIG. 1A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 1208 to the content object 1206 using one or more predetermined movements. In order to select the content object 1206, the wearer may perform an additional predetermined movement, such as holding the cursor 1208 over the content object 1206 for a predetermined period of time. The wearer may select the content object 1206 in other manners as well.

Figure 12C:
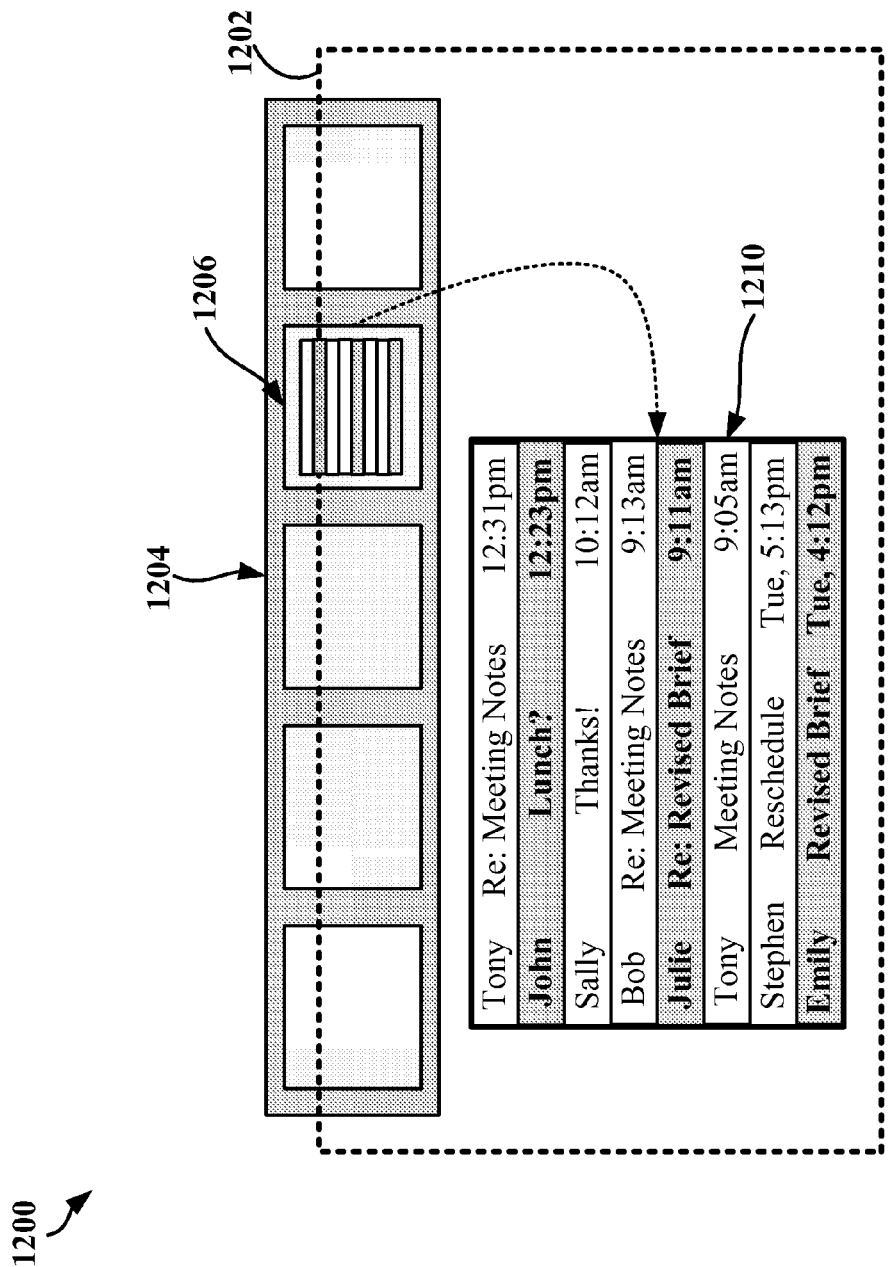
FIG. 12C shows aspects of an example user-interface after selection of a selected content object.

Once a content object 1206 is selected, the wearable computing device may cause the content object 1206 to be displayed in the view port 1202 as a selected content object. FIG. 12C shows aspects of an example user-interface after selection of a selected content object, in accordance with an embodiment.

As indicated by the dotted arrow, the content object 1206 is displayed in the view port 1202 as a selected content object 1210. As shown, the selected content object 1210 is displayed larger and in more detail in the view port 1202 than in the menu 1204. In other embodiments, however, the selected content object 1210 could be displayed in the view port 1202 smaller than or the same size as, and in less detail than or the same detail as, the menu 1204. In some embodiments, additional content (e.g., actions to be applied to, with, or based on the selected content object 1210, information related to the selected content object 1210, and/or modifiable options, preferences, or parameters for the selected content object 1210, etc.) may be showed adjacent to or nearby the selected content object 1210 in the view port 1202.

Once the selected content object 1210 is displayed in the view port 1202, a wearer of the wearable computing device may interact with the selected content object 1210. For example, as the selected content object 1210 is shown as an email inbox, the wearer may wish to read one of the emails in the email inbox. Depending on the selected content object, the wearer may interact with the selected content object in other ways as well (e.g., the wearer may locate additional information related to the selected content object 1210, modify, augment, and/or delete the selected content object 1210, etc.). To this end, the wearable computing device may be further configured to receive input data corresponding to one or more predetermined movements indicating interactions with the user-interface 1200. The input data may take any of the forms described above in connection with the selection data.

Figure 12D:
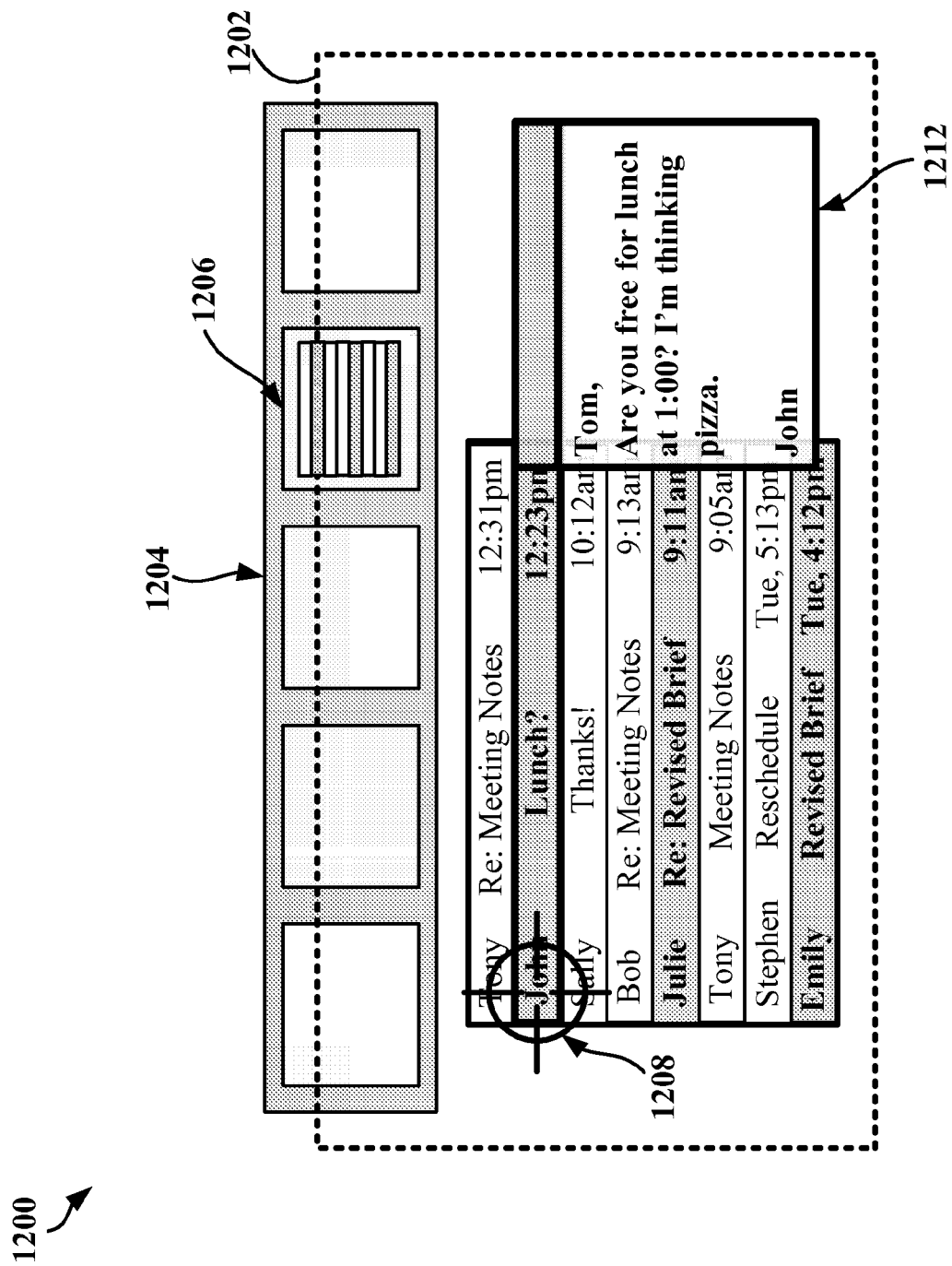
FIG. 12D shows aspects of an example user-interface after receiving input data corresponding to a user input.

FIG. 12D shows aspects of an example user-interface after receiving input data corresponding to a user input, in accordance with an embodiment. As shown, a wearer of the wearable computing device has navigated the cursor 1208 to a particular subject line in the email inbox and selected the subject line. As a result, the email 1212 is displayed in the view port, so that the wearer may read the email 1212. The wearer may interact with the user-interface 1200 in other manners as well, depending on, for example, the selected content object.

5. CONCLUSION

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A system comprising:
a non-transitory computer readable medium; and
program instructions stored on the non-transitory computer readable medium and executable by the at least one processor to:
cause a graphic display of a head-mountable device (HMD) to provide a graphical interface comprising (i) a graphical interface area comprising a portion of interest and another portion that is not of interest, (ii) a navigable area that occupies a portion of the graphical interface area and corresponds to the portion of interest within the graphical interface area, and (iii) a view port that occupies a portion of the navigable area, wherein, initially, the navigable area is fixed within the graphical interface area and the view port is movable within the navigable area, and wherein the view port corresponds to a viewing area provided by the graphic display, wherein the graphical interface area spans 360 degrees, a span of the navigable area is less than 360 degrees, and a span of the view port is less than the span of the navigable area;
subsequently receive movement data indicating a movement of the HMD;
based on the movement data, cause the view port to move, relative to the navigable area, towards a border of the navigable area with a movement speed;
determine that the movement speed exceeds a predetermined movement-speed threshold; and
based at least on the determination that the movement speed exceeds the predetermined movement-speed threshold, move both the navigable area and the view port within the graphical interface area such that the border of the navigable area maintains a predetermined difference in spacing from the view port.

2. The system of claim 1, wherein (i) the graphical interface area is a recursive graphical interface area, (ii) the navigable area comprises a navigable span of 180 degrees, and (iii) the view port comprises a viewing span of less than 180 degrees.

3. The system of claim 1, further comprising program instructions stored on the non-transitory computer readable medium and executable by the at least one processor to:
provide a continuous visual indication of the moving of the navigable area.

4. The system of claim 1, wherein the predetermined movement-speed threshold is a first predetermined movement-speed threshold, the system further comprising program instructions stored on the non-transitory computer readable medium and executable by the at least one processor to:
determine that the movement speed exceeds a second predetermined movement speed threshold that is greater than the first predetermined movement-speed threshold.

5. The system of claim 4, wherein the predetermined difference is a first predetermined difference, the system further comprising program instructions stored on the non-transitory computer readable medium and executable by the at least one processor to:
based at least on the determination that the movement speed exceeds the second predetermined movement-speed threshold, move the navigable area within the graphical interface such that the border is an additional second predetermined difference from the view port.

6. The system of claim 5, further comprising program instructions stored on the nontransitory computer readable medium and executable by the at least one processor to:
provide a continuous visual indication of the moving of the navigable area.

7. The system of claim 5, wherein the second predetermined difference is greater than the first predetermined difference.

8. The system of claim 1, wherein the navigable area is a first navigable area, the graphical interface further comprises a second navigable area that occupies a portion of the graphical interface area that is different from the portion of the graphical interface area occupied by the first navigable area.

9. The system of claim 8, wherein the predetermined movement-speed threshold is a first predetermined movement-speed threshold, the system further comprising program instructions stored on the non-transitory computer readable medium and executable by the at least one processor to:

determine that (i) the movement speed exceeds a second predetermined movement-speed threshold and (ii) the view port is within a predetermined threshold distance from the border of the first navigable area; and based on at least the determination that (i) the movement speed exceeds the second predetermined movement-speed threshold and (ii) the view port is within the predetermined threshold distance from the border of the first navigable area, cause the view port to enter the second navigable area.

10. The system of claim 8, wherein the graphical interface comprises a soft border that separates the first navigable area and the second navigable area.

11. A non-transitory computer-readable medium having stored therein instructions, that when executed by a computing device, cause the computing device to perform functions comprising:

causing a graphic display of a head-mountable device (HMD) to provide a graphical interface comprising (i) a graphical interface area comprising a portion of interest and another portion that is not of interest, (ii) a navigable area that occupies a portion of the graphical interface area and corresponds to the portion of interest within the graphical interface area, and (iii) a view port that occupies a portion of the navigable area, wherein, initially, the navigable area is fixed within the graphical interface area and the view port is movable within the navigable area, and wherein the view port corresponds to a field of view provided in the graphic display, and wherein the graphical interface area spans 360 degrees, a span of the navigable area is less than 360 degrees, and a span of the view port is less than the span of the navigable area;

subsequently receiving movement data indicating a movement of the HMD;

based on the movement data, causing the view port to move, relative to the navigable area, towards a border of the navigable area with a movement speed;

determining that the movement speed exceeds a predetermined movement-speed threshold; and based at least on the determination that the movement speed exceeds the predetermined movement-speed threshold, moving both the navigable area and the view port within the graphical interface area such that the border of the navigable area maintains a predetermined difference in spacing from the view port.

12. The non-transitory computer-readable medium of claim 11, wherein the predetermined movement-speed threshold is a first predetermined movement-speed threshold, the functions further comprising:

determining that the movement speed exceeds a second predetermined movement-speed threshold that is greater than the first predetermined movement-speed threshold.

13. The non-transitory computer-readable medium of claim 12, wherein the predetermined difference is a first predetermined difference, the functions further comprising:

based at least on the determination that the movement speed exceeds the second predetermined movement-speed threshold, moving the navigable area within the graphical interface such that the border is an additional second predetermined difference from the view port.

14. The non-transitory computer-readable medium of claim 13, wherein the second predetermined difference is greater than the first predetermined difference.

15. The non-transitory computer-readable medium of claim 11, wherein (i) the graphical interface area is a recursive graphical interface area, (ii) the navigable area comprises a navigable span of 180 degrees, and (iii) the view port comprises a viewing span of less than 180 degrees.

16. A method comprising:

causing a graphic display of a head-mountable device (HMD) to provide a graphical interface comprising (i) a graphical interface area comprising a portion of interest and another portion that is not of interest, (ii) a navigable area that occupies a portion of the graphical interface area and corresponds to the portion of interest within the graphical interface area, and (iii) a view port that occupies a portion of the navigable area, wherein, initially, the navigable area is fixed within the graphical interface area and the view port is movable within the navigable area, and wherein the view port corresponds to a field of view provided in the graphic display, and wherein the graphical interface area spans 360 degrees, a span of the navigable area is less than 360 degrees, and a span of the view port is less than the span of the navigable area;

subsequently receiving movement data indicating a movement of the HMD;

based on the movement data, causing the view port to move, relative to the navigable area, towards a border of the navigable area with a movement speed;

determining that the movement speed exceeds a predetermined movement-speed threshold; and based at least on the determination that the movement speed exceeds the predetermined movement-speed threshold, moving both the navigable area and the view port within the graphical interface area such that the border of the navigable area maintains a predetermined difference in spacing from the view port.

17. The method of claim 16, further comprising:

determining that the movement speed exceeds a second predetermined movement-speed threshold that is greater than the first predetermined movement-speed threshold.

18. The method of claim 17, further comprising:

based at least on the determination that the movement speed exceeds the second predetermined movement-speed threshold, moving the navigable area within the graphical interface such that the border is an additional second predetermined difference from the view port.

19. The method of claim 16, wherein the navigable area is a first navigable area, the graphical interface further comprises a second navigable area that occupies a portion of the graphical interface area that is different from the portion of the graphical interface area occupied by the first navigable area.

20. The method of claim 19, wherein the predetermined movement-speed threshold is a first predetermined movement-speed threshold, the method further comprising:

determining that (i) the movement speed exceeds a second predetermined movement speed threshold and (ii) the view port is within a predetermined threshold distance from the border of the first navigable area; and based on at least the determination that (i) the movement speed exceeds the second predetermined movement-speed threshold and (ii) the view port is within the predetermined threshold distance from the border of the first navigable area, causing the view port to enter the second navigable area.

* * * * *